US012625114B2

(12) United States Patent
Goertz et al.

(10) Patent No.: US 12,625,114 B2
(45) Date of Patent: May 12, 2026

(54) METHODS FOR ASSOCIATING TEST DATA FOR PART UNDER TEST WITH END ITEM COORDINATE SYSTEM AND SYSTEMS ASSOCIATED THEREWITH

(71) Applicant: The Boeing Company, Arlington, VA (US)

(72) Inventors: Samuel R. Goertz, Issaquah, WA (US); Barry A. Fetzer, Renton, WA (US)

(73) Assignee: The Boeing Company, Arlington, VA (US)

( * ) Notice: Subject to any disclaimer, the term of this patent is extended or adjusted under 35 U.S.C. 154(b) by 450 days.

(21) Appl. No.: 18/171,430

(22) Filed: Feb. 20, 2023

(65) Prior Publication Data

US 2024/0280544 A1    Aug. 22, 2024

(51) Int. Cl.
| | |
|---|---|
| *G01N 29/265* | (2006.01) |
| *G01N 29/06* | (2006.01) |
| *G01N 29/11* | (2006.01) |
| *G01N 29/44* | (2006.01) |

(52) U.S. Cl.
CPC ....... *G01N 29/265* (2013.01); *G01N 29/0609* (2013.01); *G01N 29/11* (2013.01); *G01N 29/44* (2013.01); *G01N 2291/0231* (2013.01); *G01N 2291/0289* (2013.01)

(58) Field of Classification Search
CPC ........ G01N 29/11; G01N 29/26; G01N 29/34; G01N 29/265
See application file for complete search history.

(56) References Cited

U.S. PATENT DOCUMENTS

| | | | |
|---|---|---|---|
| 4,881,177 A | 11/1989 | McClean et al. | |
| 8,892,252 B1 | 11/2014 | Troy et al. | |
| 11,422,116 B2 * | 8/2022 | De Schutter | ......... G01N 29/225 |
| 2013/0145850 A1 | 6/2013 | Lute et al. | |

(Continued)

FOREIGN PATENT DOCUMENTS

EP          2 952 890          12/2015

OTHER PUBLICATIONS

European Patent Office, Extended European Search Report, App. No. 23215262.9 (Feb. 16, 2024).

(Continued)

*Primary Examiner* — Walter L Lindsay, Jr.
*Assistant Examiner* — Andrew V Do
(74) *Attorney, Agent, or Firm* — Walters & Wasylyna LLC

(57)          ABSTRACT
A method for associating test data for a part under test with an end item coordinate system includes acquiring scan data during a plurality of scans of at least a portion of the part of an end item along a predetermined path plan using an ultrasonic scanning device of a robot. Robot location information associated with the scan data acquired during the plurality of scans is recorded. The robot location information is based on a robot coordinate system. The robot location information is translated to end item location information within the end item coordinate system based on at least three common reference points in the predetermined path plan, an electronic design model of the end item within the end item coordinate system, and the part. A non-destructive inspection (NDI) system for associating the test data with the end item coordinate system is also provided.

24 Claims, 24 Drawing Sheets

(56) References Cited

U.S. PATENT DOCUMENTS

| | | |
|---|---|---|
| 2014/0260627 A1 | 9/2014 | Ferrari et al. |
| 2021/0089817 A1 | 3/2021 | Hafenrichter et al. |

OTHER PUBLICATIONS

Mineo et al: "Robotic path planning for non-destructive testing of complex shaped surfaces," *AIP Conference Proceedings 1650, 1977* (Apr. 2, 2015). https://doi.org/10.1063/1.4914825.
James et al.: "Robot deployed Laser-Ultrasonic NDT system for inspection of large aircraft structures," IOP *Conference Series: Materials Science and Engineering*, (2021).

\* cited by examiner

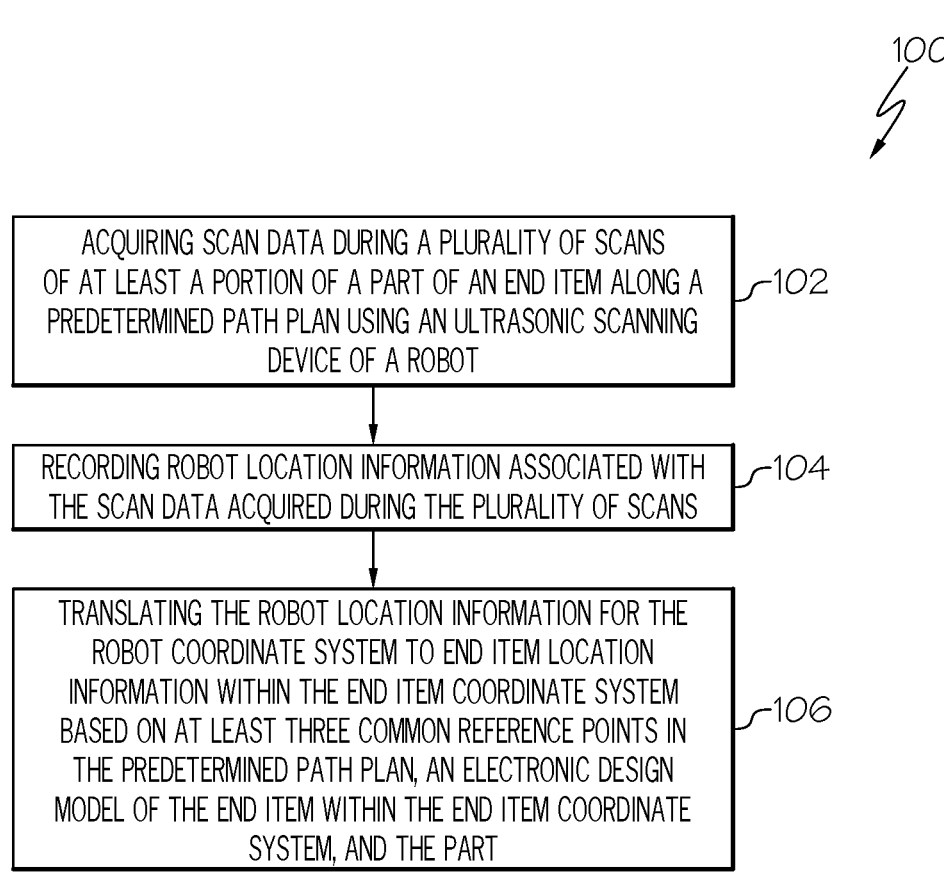

100

ACQUIRING SCAN DATA DURING A PLURALITY OF SCANS OF AT LEAST A PORTION OF A PART OF AN END ITEM ALONG A PREDETERMINED PATH PLAN USING AN ULTRASONIC SCANNING DEVICE OF A ROBOT ⟋102

RECORDING ROBOT LOCATION INFORMATION ASSOCIATED WITH THE SCAN DATA ACQUIRED DURING THE PLURALITY OF SCANS ⟋104

TRANSLATING THE ROBOT LOCATION INFORMATION FOR THE ROBOT COORDINATE SYSTEM TO END ITEM LOCATION INFORMATION WITHIN THE END ITEM COORDINATE SYSTEM BASED ON AT LEAST THREE COMMON REFERENCE POINTS IN THE PREDETERMINED PATH PLAN, AN ELECTRONIC DESIGN MODEL OF THE END ITEM WITHIN THE END ITEM COORDINATE SYSTEM, AND THE PART ⟋106

FIG. 1

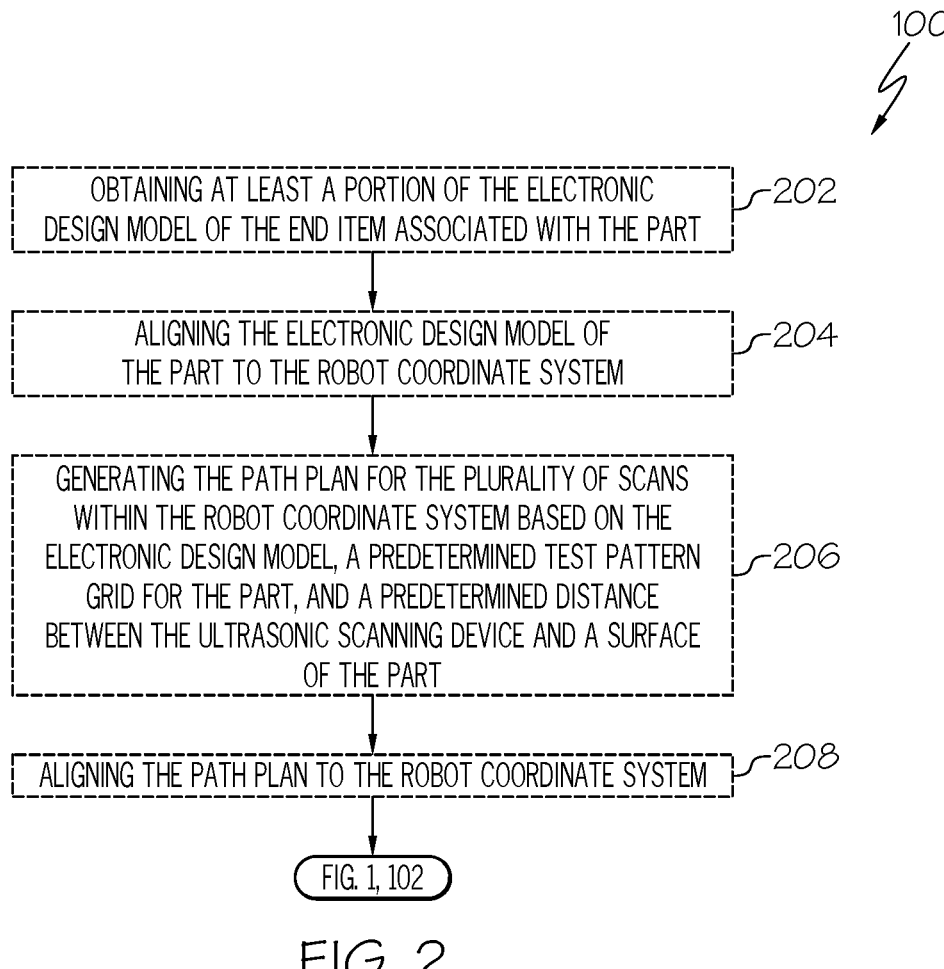

100

OBTAINING AT LEAST A PORTION OF THE ELECTRONIC DESIGN MODEL OF THE END ITEM ASSOCIATED WITH THE PART ⟶ 202

ALIGNING THE ELECTRONIC DESIGN MODEL OF THE PART TO THE ROBOT COORDINATE SYSTEM ⟶ 204

GENERATING THE PATH PLAN FOR THE PLURALITY OF SCANS WITHIN THE ROBOT COORDINATE SYSTEM BASED ON THE ELECTRONIC DESIGN MODEL, A PREDETERMINED TEST PATTERN GRID FOR THE PART, AND A PREDETERMINED DISTANCE BETWEEN THE ULTRASONIC SCANNING DEVICE AND A SURFACE OF THE PART ⟶ 206

ALIGNING THE PATH PLAN TO THE ROBOT COORDINATE SYSTEM ⟶ 208

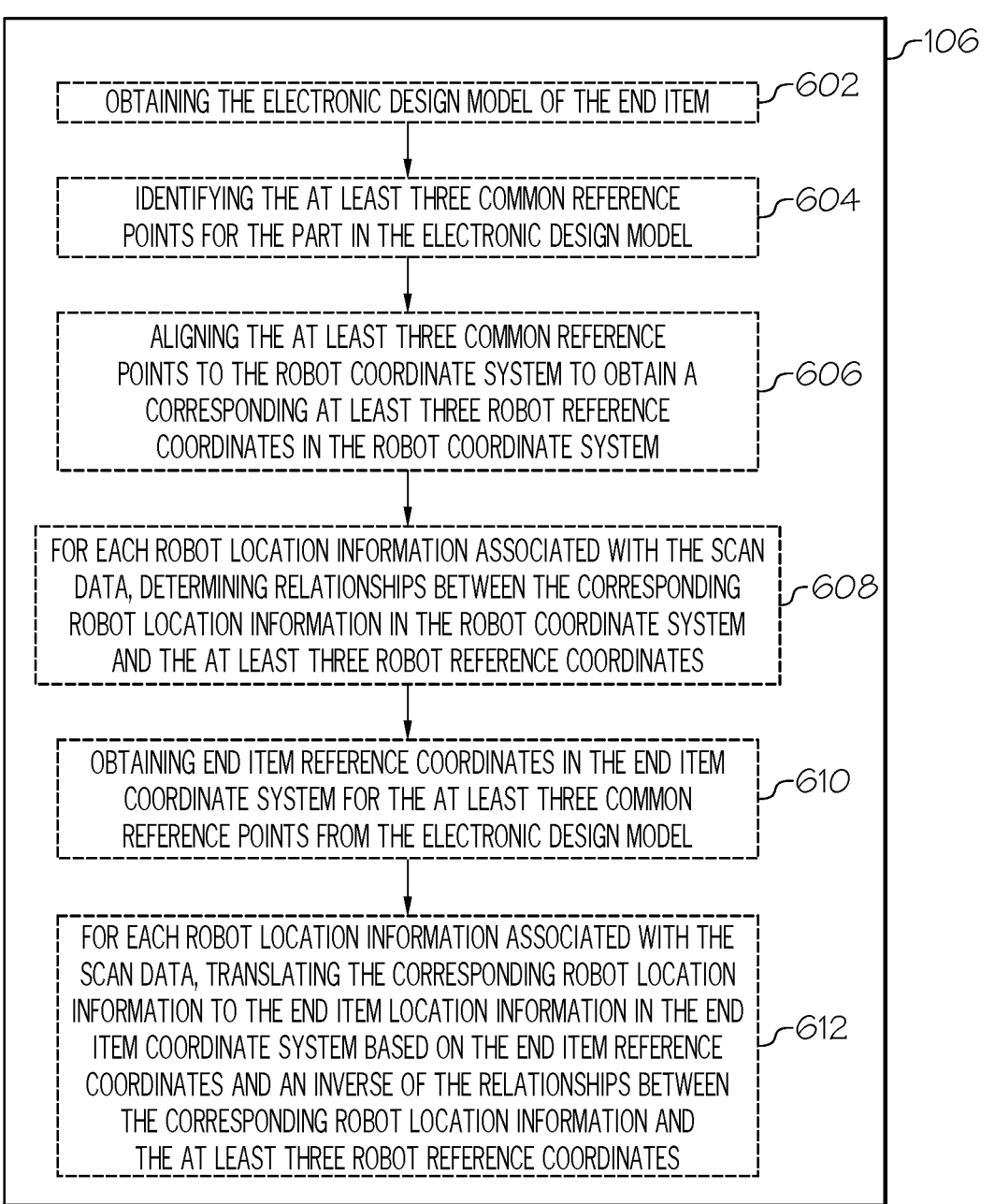

_106_

OBTAINING THE ELECTRONIC DESIGN MODEL OF THE END ITEM _602_

IDENTIFYING THE AT LEAST THREE COMMON REFERENCE POINTS FOR THE PART IN THE ELECTRONIC DESIGN MODEL _604_

ALIGNING THE AT LEAST THREE COMMON REFERENCE POINTS TO THE ROBOT COORDINATE SYSTEM TO OBTAIN A CORRESPONDING AT LEAST THREE ROBOT REFERENCE COORDINATES IN THE ROBOT COORDINATE SYSTEM _606_

FOR EACH ROBOT LOCATION INFORMATION ASSOCIATED WITH THE SCAN DATA, DETERMINING RELATIONSHIPS BETWEEN THE CORRESPONDING ROBOT LOCATION INFORMATION IN THE ROBOT COORDINATE SYSTEM AND THE AT LEAST THREE ROBOT REFERENCE COORDINATES _608_

OBTAINING END ITEM REFERENCE COORDINATES IN THE END ITEM COORDINATE SYSTEM FOR THE AT LEAST THREE COMMON REFERENCE POINTS FROM THE ELECTRONIC DESIGN MODEL _610_

FOR EACH ROBOT LOCATION INFORMATION ASSOCIATED WITH THE SCAN DATA, TRANSLATING THE CORRESPONDING ROBOT LOCATION INFORMATION TO THE END ITEM LOCATION INFORMATION IN THE END ITEM COORDINATE SYSTEM BASED ON THE END ITEM REFERENCE COORDINATES AND AN INVERSE OF THE RELATIONSHIPS BETWEEN THE CORRESPONDING ROBOT LOCATION INFORMATION AND THE AT LEAST THREE ROBOT REFERENCE COORDINATES _612_

FIG. 6

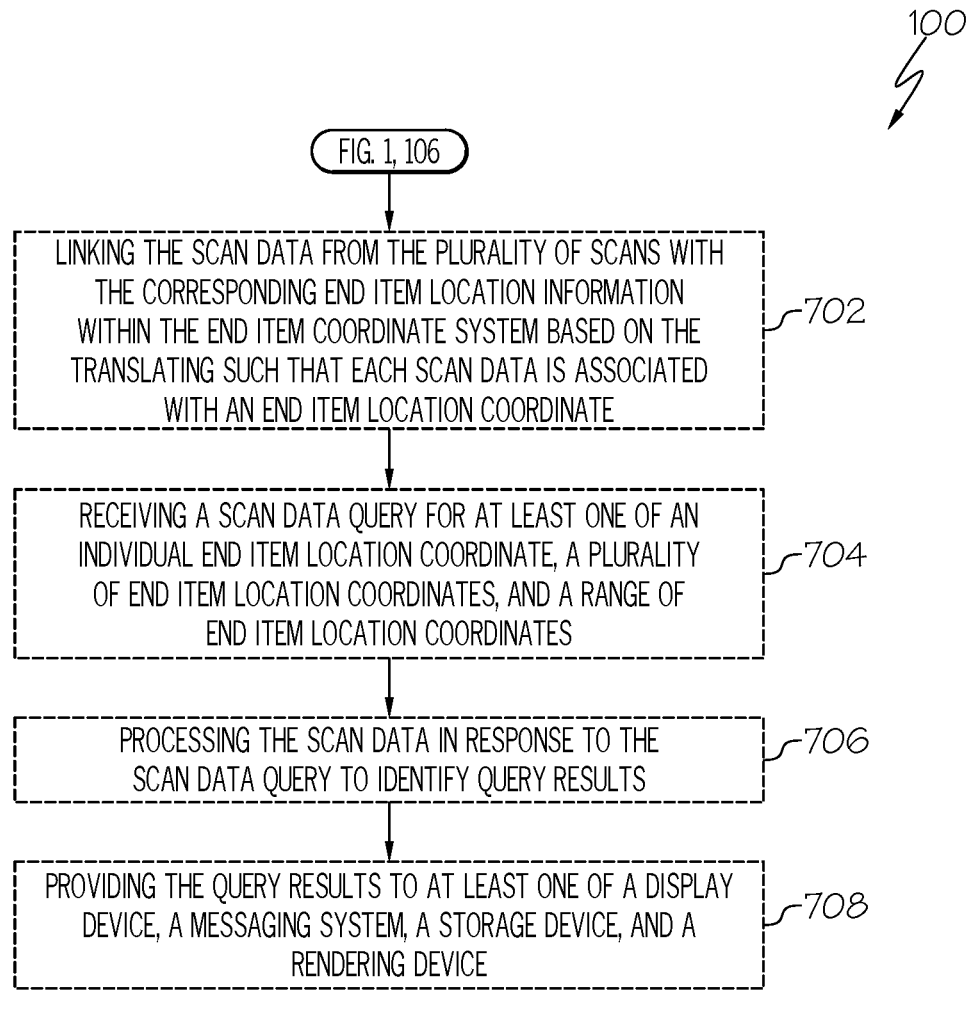

LINKING THE SCAN DATA FROM THE PLURALITY OF SCANS WITH THE CORRESPONDING END ITEM LOCATION INFORMATION WITHIN THE END ITEM COORDINATE SYSTEM BASED ON THE TRANSLATING SUCH THAT EACH SCAN DATA IS ASSOCIATED WITH AN END ITEM LOCATION COORDINATE — 702

RECEIVING A SCAN DATA QUERY FOR AT LEAST ONE OF AN INDIVIDUAL END ITEM LOCATION COORDINATE, A PLURALITY OF END ITEM LOCATION COORDINATES, AND A RANGE OF END ITEM LOCATION COORDINATES — 704

PROCESSING THE SCAN DATA IN RESPONSE TO THE SCAN DATA QUERY TO IDENTIFY QUERY RESULTS — 706

PROVIDING THE QUERY RESULTS TO AT LEAST ONE OF A DISPLAY DEVICE, A MESSAGING SYSTEM, A STORAGE DEVICE, AND A RENDERING DEVICE — 708

FIG. 7

$$^{IR}P = ^{UD}P + ^{IR}P_{UDORG}$$

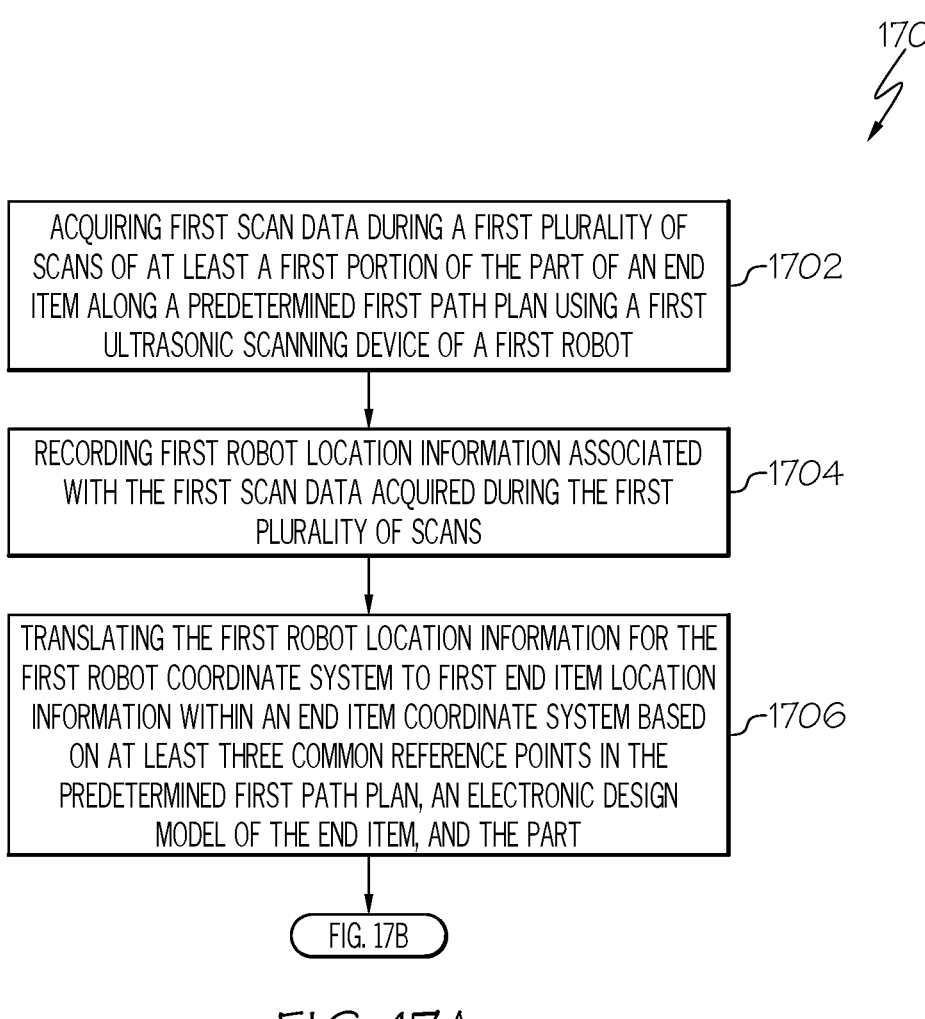

1700

ACQUIRING FIRST SCAN DATA DURING A FIRST PLURALITY OF SCANS OF AT LEAST A FIRST PORTION OF THE PART OF AN END ITEM ALONG A PREDETERMINED FIRST PATH PLAN USING A FIRST ULTRASONIC SCANNING DEVICE OF A FIRST ROBOT ⸜1702

RECORDING FIRST ROBOT LOCATION INFORMATION ASSOCIATED WITH THE FIRST SCAN DATA ACQUIRED DURING THE FIRST PLURALITY OF SCANS ⸜1704

TRANSLATING THE FIRST ROBOT LOCATION INFORMATION FOR THE FIRST ROBOT COORDINATE SYSTEM TO FIRST END ITEM LOCATION INFORMATION WITHIN AN END ITEM COORDINATE SYSTEM BASED ON AT LEAST THREE COMMON REFERENCE POINTS IN THE PREDETERMINED FIRST PATH PLAN, AN ELECTRONIC DESIGN MODEL OF THE END ITEM, AND THE PART ⸜1706

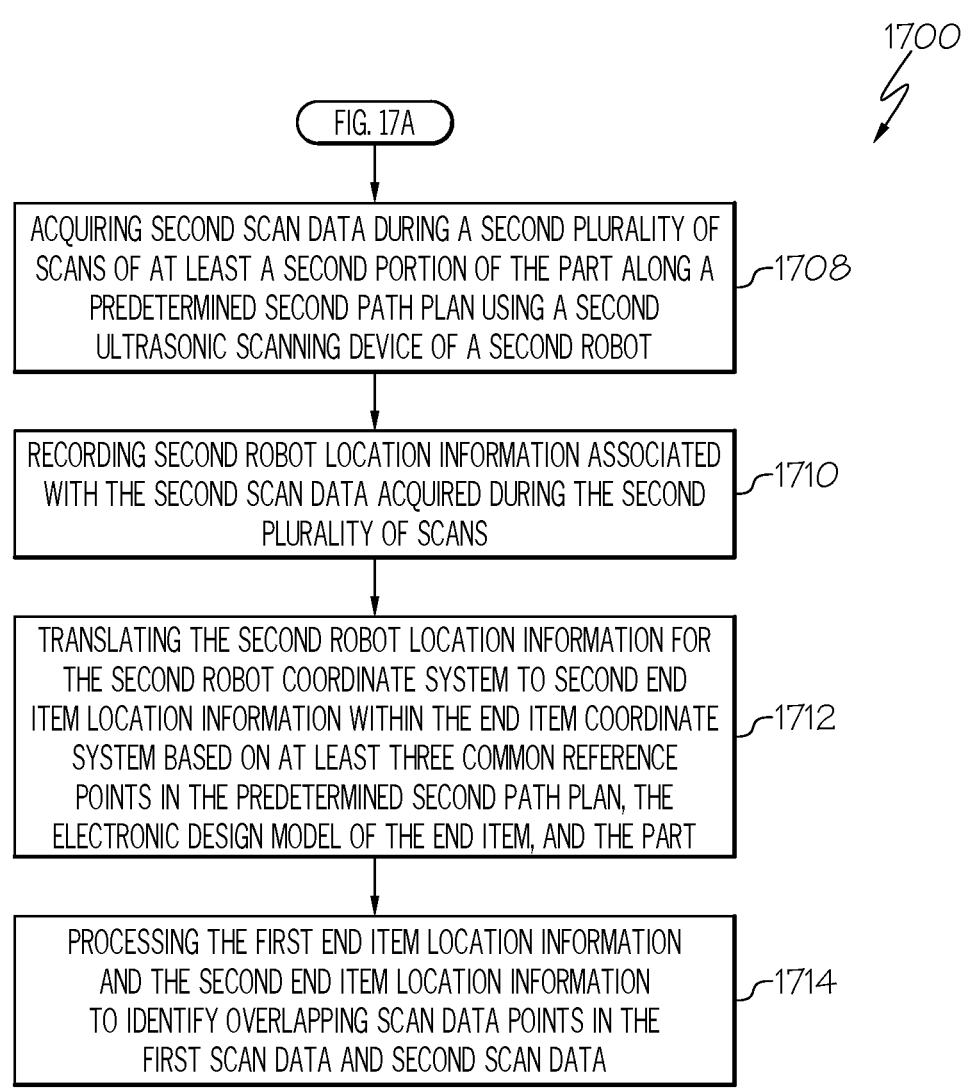

ACQUIRING SECOND SCAN DATA DURING A SECOND PLURALITY OF SCANS OF AT LEAST A SECOND PORTION OF THE PART ALONG A PREDETERMINED SECOND PATH PLAN USING A SECOND ULTRASONIC SCANNING DEVICE OF A SECOND ROBOT ⌐1708

RECORDING SECOND ROBOT LOCATION INFORMATION ASSOCIATED WITH THE SECOND SCAN DATA ACQUIRED DURING THE SECOND PLURALITY OF SCANS ⌐1710

TRANSLATING THE SECOND ROBOT LOCATION INFORMATION FOR THE SECOND ROBOT COORDINATE SYSTEM TO SECOND END ITEM LOCATION INFORMATION WITHIN THE END ITEM COORDINATE SYSTEM BASED ON AT LEAST THREE COMMON REFERENCE POINTS IN THE PREDETERMINED SECOND PATH PLAN, THE ELECTRONIC DESIGN MODEL OF THE END ITEM, AND THE PART ⌐1712

PROCESSING THE FIRST END ITEM LOCATION INFORMATION AND THE SECOND END ITEM LOCATION INFORMATION TO IDENTIFY OVERLAPPING SCAN DATA POINTS IN THE FIRST SCAN DATA AND SECOND SCAN DATA ⌐1714

FIG. 17B

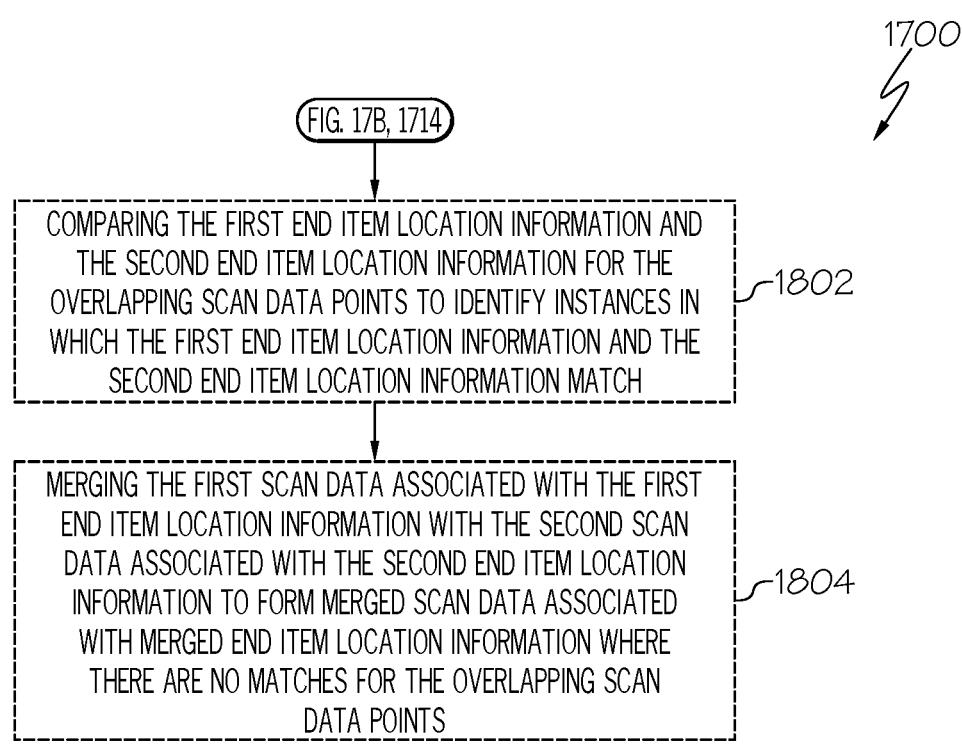

COMPARING THE FIRST END ITEM LOCATION INFORMATION AND THE SECOND END ITEM LOCATION INFORMATION FOR THE OVERLAPPING SCAN DATA POINTS TO IDENTIFY INSTANCES IN WHICH THE FIRST END ITEM LOCATION INFORMATION AND THE SECOND END ITEM LOCATION INFORMATION MATCH 1802

MERGING THE FIRST SCAN DATA ASSOCIATED WITH THE FIRST END ITEM LOCATION INFORMATION WITH THE SECOND SCAN DATA ASSOCIATED WITH THE SECOND END ITEM LOCATION INFORMATION TO FORM MERGED SCAN DATA ASSOCIATED WITH MERGED END ITEM LOCATION INFORMATION WHERE THERE ARE NO MATCHES FOR THE OVERLAPPING SCAN DATA POINTS 1804

FIG. 18

METHODS FOR ASSOCIATING TEST DATA FOR PART UNDER TEST WITH END ITEM COORDINATE SYSTEM AND SYSTEMS ASSOCIATED THEREWITH

FIELD

The present disclosure relates generally to associating test data for a part under test with an end item coordinate system and, particularly, to translating location information for ultrasonic scan data from a coordinate system in the testing environment with the end item coordinate system. Various examples of methods and systems for associating the test data with the ends item coordinate system are disclosed. For example, applications of the disclosed methods and systems to non-destructive inspection (NDI) of parts constructed of composite materials for use in aircraft are disclosed herein. Applications to various other types of parts, other types of testing, and other types of end items are also contemplated.

BACKGROUND

For current testing environments, location information associated with test data for a part under test is based on a point of origin in the testing environment and a corresponding testing coordinate system. Moreover, for certain test data, such as ultrasonic scan data, the location information captured by the testing instrument may only be in two dimensions (e.g., x, y) regardless of whether the part is contoured or shaped in three-dimensions. One technique for translating test data to an end item coordinate system uses pixel data based on the two-dimensional test data. The pixel data is then mapped on a three-dimensional model of the part. This technique is not efficient and not particularly accurate.

Accordingly, those skilled in the art continue with research and development efforts to streamline translation of test data from a testing environment to design environments and in-service environments to improve various product lifecycle management processes.

SUMMARY

Disclosed are examples of a method for associating test data for a part under test with an end item coordinate system and a non-destructive inspection (NDI) system associated therewith. Examples of a method for integrating adjacent sets of test data for a part under test in an electronic design model are also disclosed. The following is a non-exhaustive list of examples, which may or may not be claimed, of the subject matter according to the present disclosure.

In an example, the disclosed method for associating test data for a part under test with an end item coordinate system includes: (1) acquiring scan data during a plurality of scans of at least a portion of the part of an end item along a predetermined path plan using an ultrasonic scanning device of a robot, wherein the ultrasonic scanning device is controlled by a robot computing system; (2) recording robot location information associated with the scan data acquired during the plurality of scans, wherein the robot location information is based at least in part on a robot coordinate system associated with the robot; and (3) translating the robot location information for the robot coordinate system to end item location information within the end item coordinate system based on at least three common reference points in the predetermined path plan, an electronic design model of the end item within the end item coordinate system, and the part.

In an example, the disclosed NDI system for associating test data for a part under test with an end item coordinate system includes a robot and a robot computing system. The robot includes a base, a mechanical arm with a proximal end secured to the base and a distal end, a flange movably secured to the distal end of the mechanical arm, and an ultrasonic scanning device secured to the flange. The robot computing system is in operative communication with the robot and configured to control movement of the mechanical arm and operation of the ultrasonic scanning device. The robot computing system includes at least one processor and associated memory and at least one storage device storing at least one application program and robot data. The robot computing system and the robot, in conjunction with the at least one processor running first application programs and accessing first robot data, is configured to acquire scan data during a plurality of scans of at least a portion of the part of an end item along a predetermined path plan using the ultrasonic scanning device. The robot computing system and the robot, in conjunction with the at least one processor running second application programs and accessing second robot data, is configured to record robot location information associated with the scan data acquired during the plurality of scans. The robot location information is based at least in part on a robot coordinate system associated with the robot. The robot computing system, in conjunction with the at least one processor running third application programs and accessing third robot data, is configured to translate the robot location information for the robot coordinate system to end item location information within the end item coordinate system based on at least three common reference points in the predetermined path plan, an electronic design model of the end item within the end item coordinate system, and the part.

In an example, the disclosed method for integrating adjacent sets of test data for a part under test in an electronic design model includes: (1) acquiring first scan data during a first plurality of scans of at least a first portion of the part of an end item along a predetermined first path plan using a first ultrasonic scanning device of a first robot, wherein the first ultrasonic scanning device is controlled by a first robot computing system; (2) recording first robot location information associated with the first scan data acquired during the first plurality of scans, wherein the first robot location information is based at least in part on a first robot coordinate system associated with the first robot; (3) translating the first robot location information for the first robot coordinate system to first end item location information within an end item coordinate system based on at least three common reference points in the predetermined first path plan, an electronic design model of the end item, and the part; (4) acquiring second scan data during a second plurality of scans of at least a second portion of the part along a predetermined second path plan using a second ultrasonic scanning device of a second robot, wherein the second ultrasonic scanning device is controlled by a second robot computing system; (5) recording second robot location information associated with the second scan data acquired during the second plurality of scans, wherein the second robot location information is based at least in part on a second robot coordinate system associated with the second robot; (6) translating the second robot location information for the second robot coordinate system to second end item location information within the end item coordinate system based on at least three common reference points in the predetermined second path plan, the electronic design model of the end item, and the part; and (7) processing the first end item location information and the second end item location information to identify overlapping scan data points in the first scan data and second scan data.

Other examples of the disclosed methods and systems will become apparent from the following detailed description, the accompanying drawings, and the appended claims.

BRIEF DESCRIPTION OF THE DRAWINGS

FIG. 1 is a flow diagram of an example of a method for associating test data for a part under test with an end item coordinate system;

FIG. 2, in combination with FIG. 1, is a flow diagram of another example of a method for associating test data for a part under test with an end item coordinate system;

FIG. 6 is a flow diagram of an example of the translating of the robot location information shown in the method of FIG. 1;

FIG. 7, in combination with FIG. 1, is a flow diagram of another example of a method for associating test data for a part under test with an end item coordinate system;

FIGS. 17A and 17B is a flow diagram of an example of a method for integrating adjacent sets of test data for a part under test in an electronic design model;

FIG. 18, in combination with FIGS. 17A and 17B, is a flow diagram of another example of a method for integrating adjacent sets of test data for a part under test in an electronic design model;

DETAILED DESCRIPTION

Figure 14:
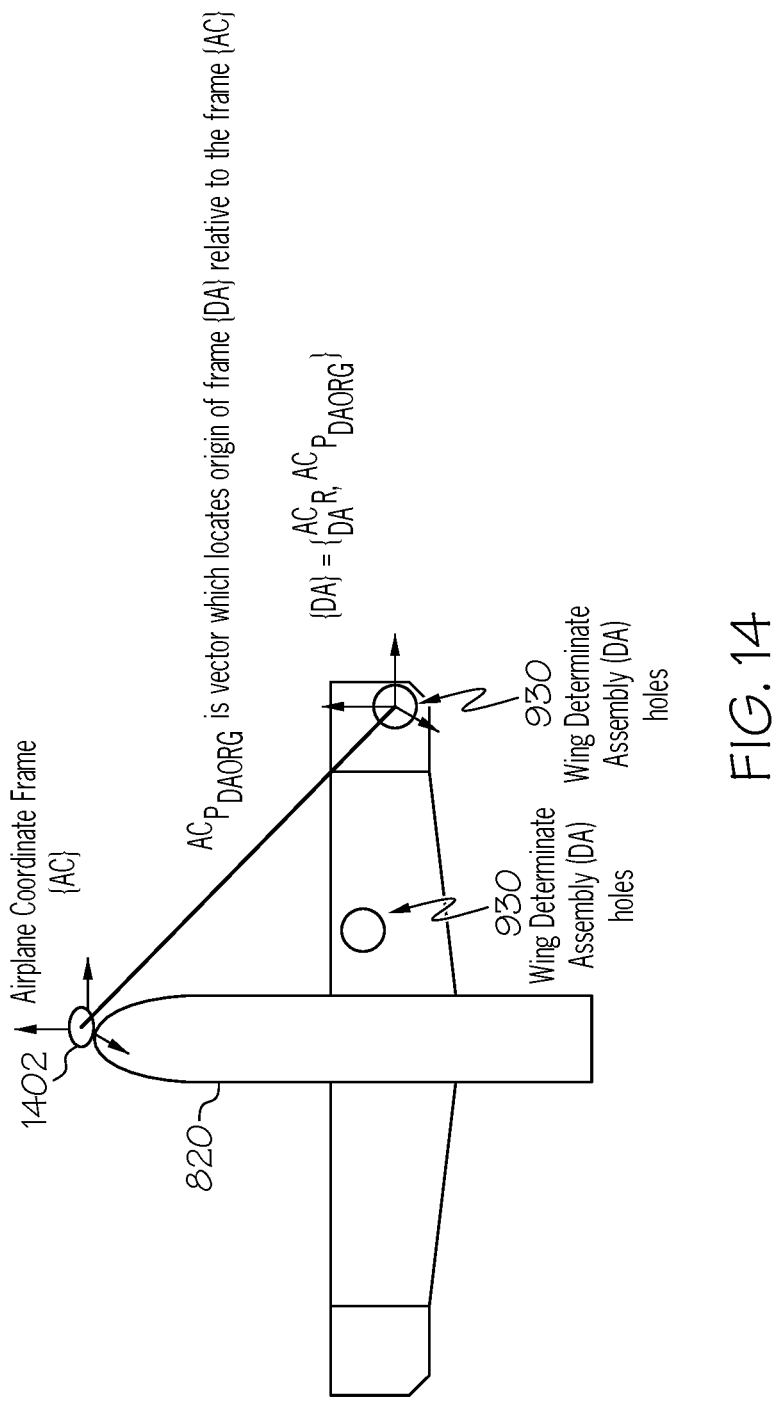
FIG. 14 is a functional diagram showing an example of the end item shown in the NDI system of FIG. 8 and examples of the at least three common reference points and end item coordinate system identified in FIG. 1.

Referring generally to FIGS. 1-9, by way of examples, the present disclosure is directed to a method 100 for associating test data for a part 802 under test with an end item coordinate system 1402 (see, e.g., FIG. 14). FIG. 1 discloses an example of the method 100 that includes acquiring 102 scan data 922 for the part 802, recording 104 robot location information 926 associated with the scan data 922, and translating 106 the robot location information 926 to end item location information 928 within the end item coordinate system 1402. FIGS. 2-7 disclose various other examples of the method 100.

Figure 15:
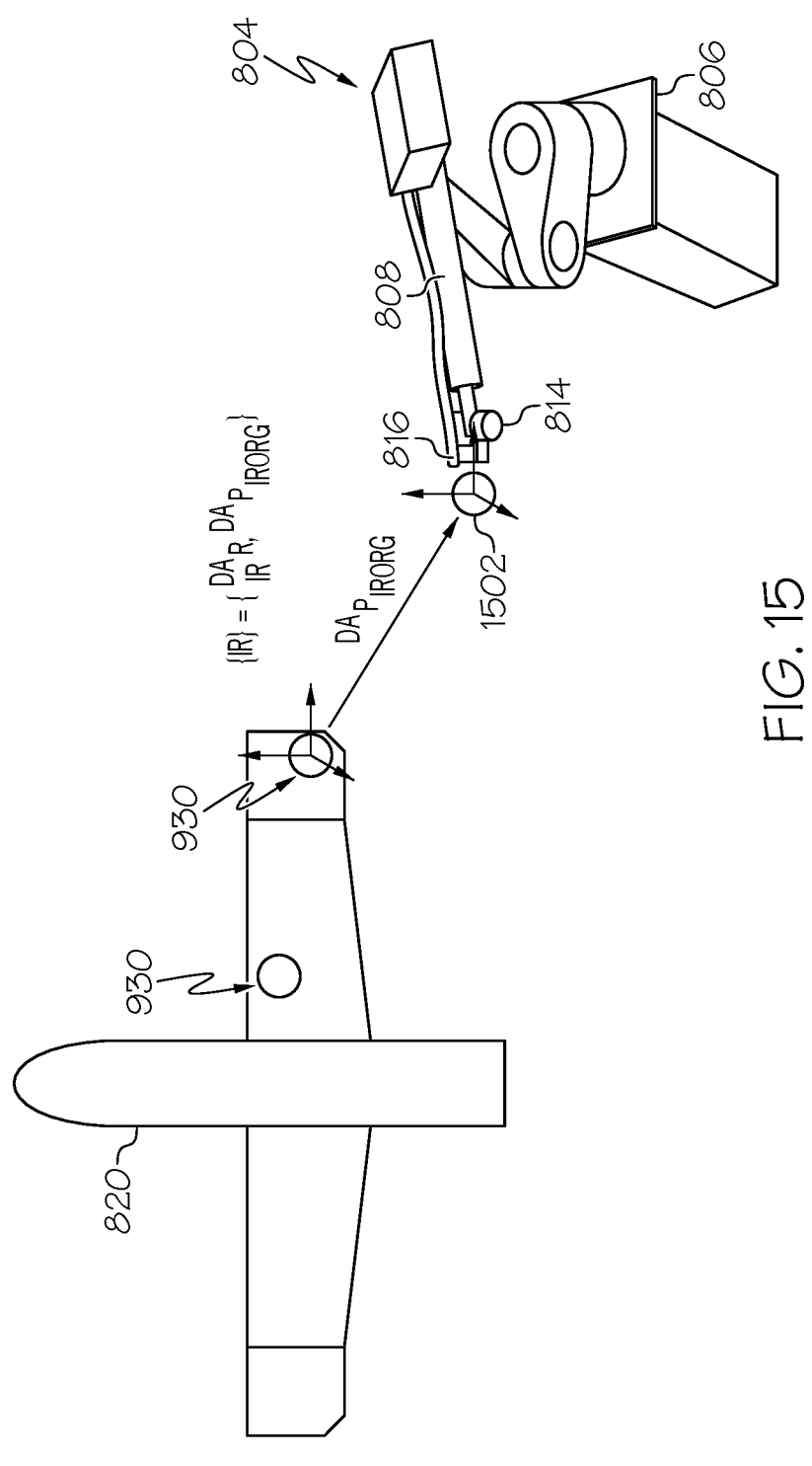
FIG. 15 is a functional diagram showing examples of the robot and end item shown in the NDI system of FIG. 8 and examples of the robot coordinate system and common reference points identified in FIG. 1.
Figure 16:
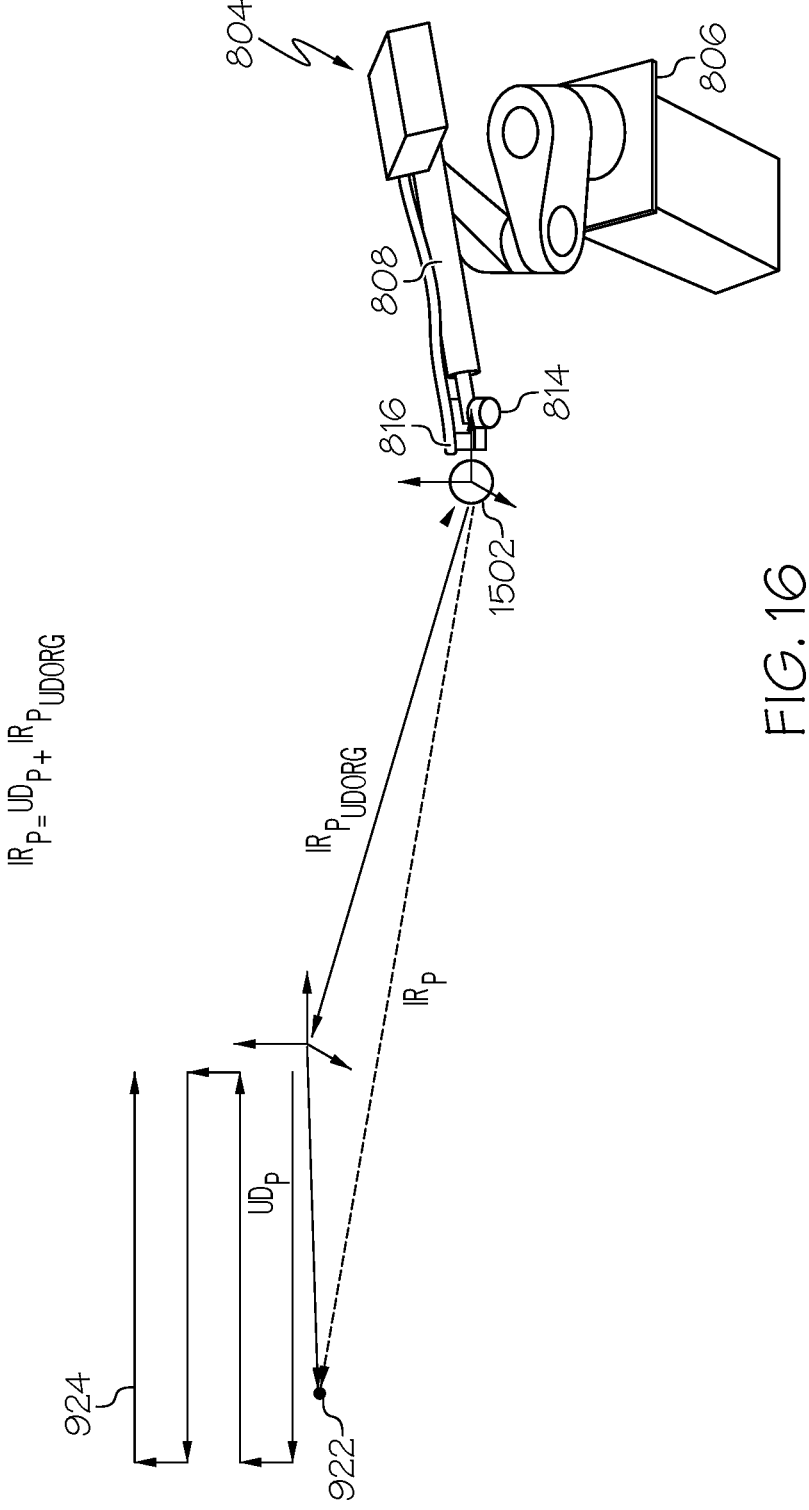
FIG. 16 is a functional diagram showing an example of the robot shown in the NDI system of FIG. 8 and examples of the predetermined path plan, scan data, and robot coordinate system identified in FIG. 1.
Figure 19:
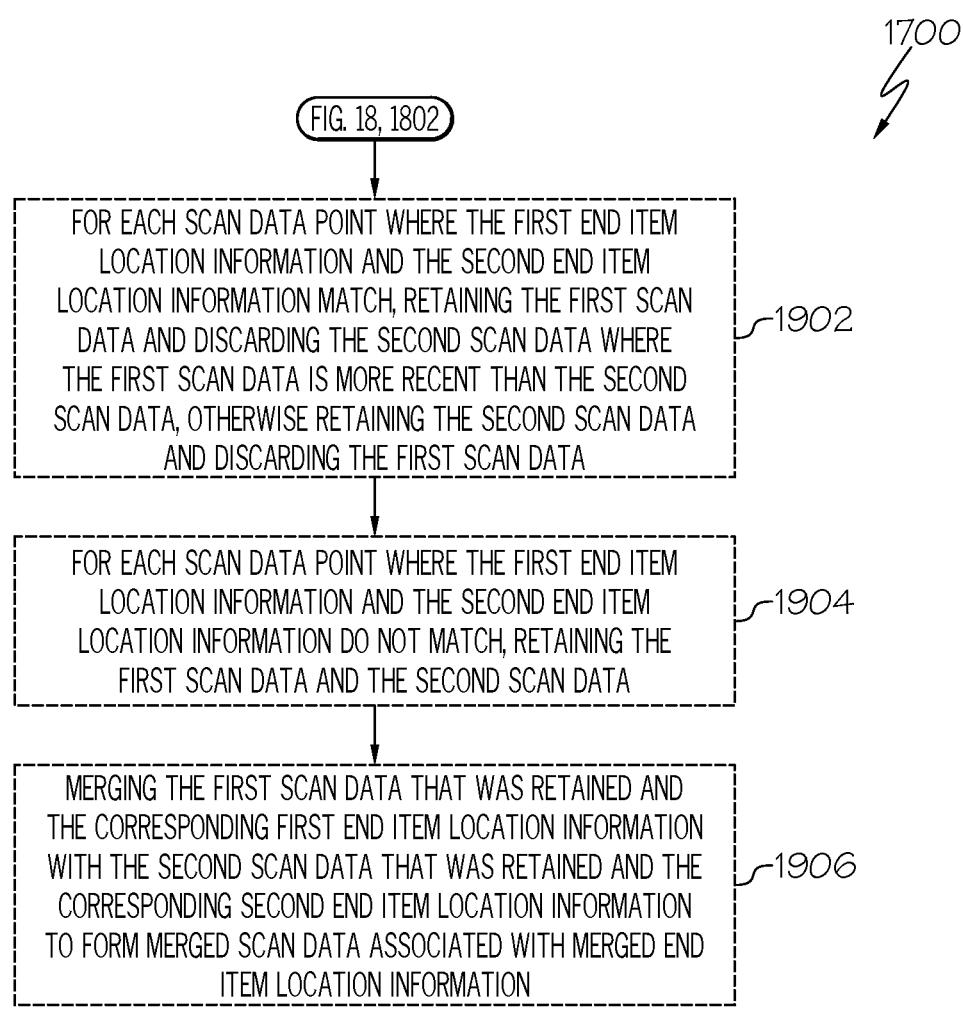
FIG. 19, in combination with FIGS. 17A, 17B, and 18, is a flow diagram of yet another example of a method for integrating adjacent sets of test data for a part under test in an electronic design model.
Figure 20:
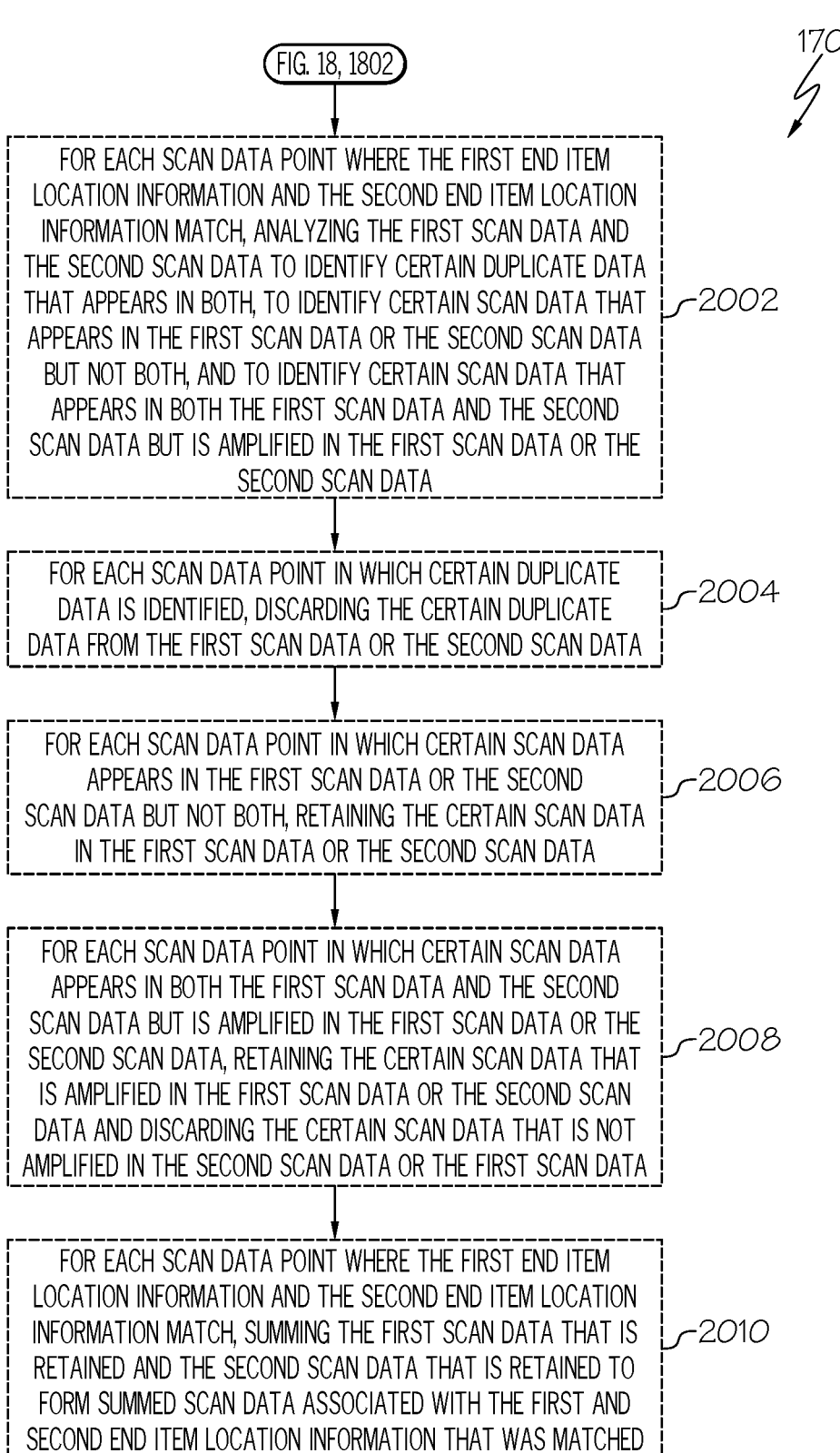
FIG. 20, in combination with FIGS. 17A, 17B, and 18, is a flow diagram of still another example of a method for integrating adjacent sets of test data for a part under test in an electronic design model.
Figure 21:
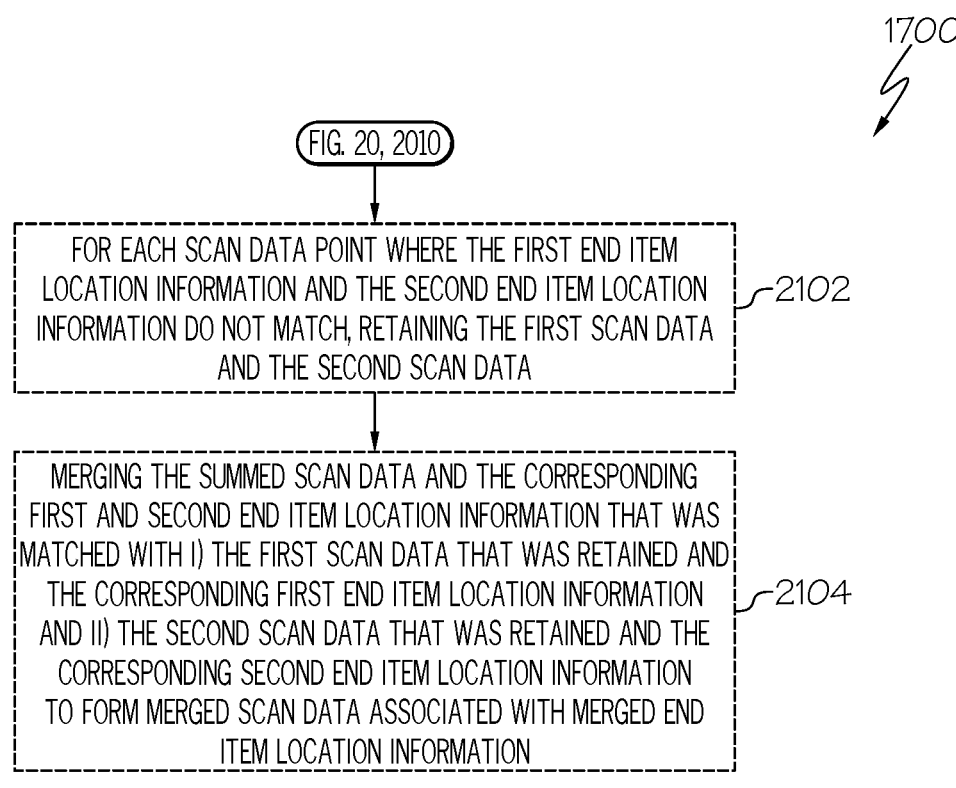
FIG. 21, in combination with FIGS. 17A, 17B, 18, and 20, is a flow diagram of still yet another example of a method for integrating adjacent sets of test data for a part under test in an electronic design model.

With reference again to FIGS. 1, 8 and 9, in one or more examples, a method 100 for associating test data for a part 802 under test with an end item coordinate system 1402 (see, e.g., FIG. 14) includes acquiring 102 scan data 922 during a plurality of scans of at least a portion of the part 802 of an end item 820 along a predetermined path plan 924 using an ultrasonic scanning device 816 of a robot 804. The ultrasonic scanning device 816 is controlled by a robot computing system 818. At 104, robot location information 926 associated with the scan data 922 acquired during the plurality of scans is recorded. The robot location information 926 is based at least in part on a robot coordinate system 1502 (see, e.g., FIG. 15) associated with the robot 804. At 106, the robot location information 926 for the robot coordinate system 1502 is translated to end item location information 928 within the end item coordinate system 1402 based on at least three common reference points 930 in the predetermined path plan 924, an electronic design model 932 of the end item 820 within the end item coordinate system 1402, and the part 802.

In another example of the method 100, the electronic design model 932 comprises a three-dimensional computer-aided design model. In yet another example of the method 100, the scan data 922 comprises waveform data from each scan of the plurality of scans. In still another example of the method 100, each scan of the plurality of scans comprises a measurement of an echo off a back wall of an emitted sound wave from the ultrasonic scanning device 816. In still yet another example of the method 100, the predetermined path plan 924 comprises a contiguous path for traversal of the part 802 by the ultrasonic scanning device 816.

In another example of the method 100, the robot location information 926 within the robot coordinate system 1502 is expressed in x, y, z coordinates with an x-axis extending along a horizontal plane from an origin associated with a central point of the ultrasonic scanning device 816, a y-axis perpendicular to the origin of the x-axis in the horizontal plane, and a z-axis perpendicular to the origin of the x-axis in a vertical plane.

In yet another example of the method 100, the end item location information 928 within the end item coordinate system 1402 is expressed as x, y, z coordinates with an x-axis extending along a horizontal plane from an origin at a central front point of the end item 820 to a central aft point, a y-axis perpendicular to the origin of the x-axis in the horizontal plane, and a z-axis perpendicular to the origin of the x-axis in a vertical plane.

In still yet another example of the method 100, each common reference point comprises at least one of a determinate assembly within the part 802, a pilot hole within the part 802, a stringer within the part 802, and a key visible feature associated with the part 802.

With reference again to FIGS. 1, 2, 8 and 9, in another example, the method 100 of FIG. 1 also includes obtaining 202 at least a portion of the electronic design model 932 of the end item 820 associated with the part 802. At 204, the electronic design model 932 of the part 802 is aligned to the robot coordinate system 1502 (see, e.g., FIG. 15). At 206, the path plan for the plurality of scans within the robot coordinate system 1502 is generated based on the electronic design model 932, a predetermined test pattern grid for the part 802, and a predetermined distance between the ultrasonic scanning device 816 and a surface 830 of the part 802. At 208, the path plan is aligned to the robot coordinate system 1502. In this example, the method 100 advances from 208 to 102 of FIG. 1.

With reference again to FIGS. 1-3, 8 and 9, in yet another example, the method 100 of FIG. 1 continues from 208 of FIGS. 2 to 302 of FIG. 3 where the at least three common reference points 930 for the part 802 are identified in the electronic design model 932. At 304, the at least three common reference points 930 are aligned to the robot coordinate system 1502 (see, e.g., FIG. 15) to obtain a corresponding at least three robot reference coordinates in the robot coordinate system 1502. At 306, the part 802 is positioned in relation to the robot 804 prior to the acquiring 102 of the scan data 922. At 308, the ultrasonic scanning device 816 is moved to each of the at least three robot reference coordinates. At 310, for each robot reference coordinate, the part 802 is scanned in a vicinity of the corresponding robot reference coordinate to detect at least three as-built reference coordinates relating to the at least three robot reference coordinates and to acquire location information in the robot coordinate system 1502 for the at least three as-built reference coordinates. At 312, alignment of the path plan is adjusted within the robot coordinate system 1502 to obtain the predetermined path plan 924 based on offsets between the at least three as-built reference coordinates and the at least three robot reference coordinates. In this example, the method 100 advances from 312 to 102 of FIG. 1.

With reference again to FIGS. 1, 4, 8 and 9, in still another example, the method 100 of FIG. 1 also includes obtaining 402 at least a portion of the electronic design model 932 of the end item 820 associated with the part 802. At 404, the at least three common reference points 930 for the part 802 are identified in the electronic design model 932. At 406, the at least three common reference points 930 are aligned to the robot coordinate system 1502 (see, e.g., FIG. 15) to obtain a corresponding at least three robot reference coordinates in the robot coordinate system 1502. At 408, the part 802 is positioned in relation to the robot 804 prior to the acquiring 102 of the scan data 922. At 410, the ultrasonic scanning device 816 is moved to each of the at least three robot reference coordinates. At 412, for each robot reference coordinate, the part 802 is scanned in a vicinity of the corresponding robot reference coordinate to detect at least three as-built reference coordinates relating to the at least three robot reference coordinates and to acquire location information in the robot coordinate system 1502 for the at least three as-built reference coordinates. At 414, the at least three as-built reference coordinates are compared to the at least three robot reference coordinates to determine if there is an offset requiring adjustment of the predetermined path plan 924. In this example, the method 100 advances from 414 to 102 of FIG. 1.

With reference again to FIGS. 1, 5, 8 and 9, in still yet another example, the method 100 of FIG. 1 also includes obtaining 502 at least a portion of the electronic design model 932 of the end item 820 associated with the part 802. At 504, the at least three common reference points 930 for the part 802 are identified in the electronic design model 932. At 506, the at least three common reference points 930 are aligned to the robot coordinate system 1502 (see, e.g., FIG. 15) to obtain a corresponding at least three robot reference coordinates in the robot coordinate system 1502. At 508, the part 802 is positioned in relation to the robot 804 prior to the acquiring 102 of the scan data 922. At 510, the ultrasonic scanning device 816 is moved to each of the at least three robot reference coordinates. At 512, for each robot reference coordinate, the part 802 is scanned in a vicinity of the corresponding robot reference coordinate to detect at least three as-built reference coordinates relating to the at least three robot reference coordinates and to acquire location information in the robot coordinate system 1502 for the at least three as-built reference coordinates. At 514, the at least three robot reference coordinates are adjusted based on the at least three as-built reference coordinates to obtain at least three adjusted reference coordinates in the robot coordinate system 1502. In this example, the method 100 advances from 514 to 102 of FIG. 1.

With reference again to FIGS. 1, 6, 8 and 9, in another example of the method 100, the translating 106 the robot location information 926 includes obtaining 602 the electronic design model 932 of the end item 820. At 604, the at least three common reference points 930 for the part 802 are identified in the electronic design model 932. At 606, the at least three common reference points 930 are aligned to the robot coordinate system 1502 (see, e.g., FIG. 15) to obtain a corresponding at least three robot reference coordinates in the robot coordinate system 1502. At 608, for each robot location information 926 associated with the scan data 922, relationships are determined between the corresponding robot location information 926 in the robot coordinate system 1502 and the at least three robot reference coordinates. At 610, end item reference coordinates in the end item coordinate system 1402 (see, e.g., FIG. 14) are obtained for the at least three common reference points 930 from the electronic design model 932. At 612, for each robot location information 926 associated with the scan data 922, the corresponding robot location information 926 is translated to the end item location information 928 in the end item coordinate system 1402 based on the end item reference coordinates and an inverse of the relationships between the corresponding robot location information 926 and the at least three robot reference coordinates.

In a further example of the method 100, the at least three robot reference coordinates are expressed as x, y, z coordinates with an x-axis extending along a horizontal plane from an origin associated with a central point of the ultrasonic scanning device 816, a y-axis perpendicular to the origin of the x-axis in the horizontal plane, and a z-axis perpendicular to the origin of the x-axis in a vertical plane.

In another further example of the method 100, the relationships between the corresponding robot location information 926 and the robot reference coordinates and the inverse thereof for the end item reference coordinates and the end item location information 928 comprise the end item reference coordinates relative to the end item location information 928 multiplied by the robot location information 926 relative to the robot reference coordinates.

In yet another further example of the method 100, the end item reference coordinates are expressed as x, y, z coordinates with an x-axis extending along a horizontal plane from an origin at a central front point of the end item 820 to a central aft point, a y-axis perpendicular to the origin of the x-axis in the horizontal plane, and a z-axis perpendicular to the origin of the x-axis in a vertical plane.

With reference again to FIGS. 1, 7 and 8, in yet another example, the method 100 continues from 106 of FIGS. 1 to 702 of FIG. 7 where the scan data 922 from the plurality of scans is linked with the corresponding end item location information 928 within the end item coordinate system 1402 (see, e.g., FIG. 14) based on the translating such that each scan data 922 is associated with an end item location coordinate.

With reference again to FIGS. 1 and 7-9, in a further example, the method 100 also includes 704 where a scan data query is received for at least one of an individual end item location coordinate, a plurality of end item location coordinates, and a range of end item location coordinates. At 706, the scan data 922 is processed in response to the scan data query to identify query results. At 708, the query results are provided to at least one of a display device 920, a messaging system, a storage device, and a rendering device.

In an even further example of the method 100, the query results form a visual overlay for the part 802 within the electronic design model 932 representative of at least defective locations based on the scan data 922.

In a yet further example, the electronic design model 932 is rendered in three-dimensions and the visual overlay comprises a solid three-dimensional overlay rendered in multiple colors representing predetermined ranges of the scan data 922. In a still further example, the solid three-dimensional overlay permits selection of a scan data point and display of ultrasonic amplitude data for the scan data point in response to the selection. In this example, the ultrasonic amplitude data is indicative of attenuation levels detected at the scan data point. In another still further example, the solid three-dimensional overlay permits selection of a scan data point and display of ultrasonic thickness data for the scan data point in response to the selection, wherein the ultrasonic thickness data is indicative of at least one of internal reflections and internal anomalies detected at the scan data point.

In another yet further example, the query results form a visual overlay for the part 802 within the electronic design model 932 representative of at least acceptable locations based on the scan data 922.

In another yet further example, the query results form a visual overlay for the part 802 within the electronic design model 932 representative of at least degraded locations based on the scan data 922. In a still further example, degraded locations in the visual overlay are identified automatically by processing the scan data 922. In another still further example, the visual overlay permits selection of a degraded location for further disposition including at least one of in-service testing, repair, replacement, review of manufacturing processes and review of design.

In another even further example of the method 100, the end item location coordinate is expressed as x, y, z coordinates with an x-axis extending along a horizontal plane from an origin at a central front point of the end item 820 to a central aft point, a y-axis perpendicular to the origin of the x-axis in the horizontal plane, and a z-axis perpendicular to the origin of the x-axis in a vertical plane. In a yet further example, at least a portion of end item location coordinates and the corresponding end item location information 928 are stored at an electronic data storage center 826 and accessible via a communication network 822 to at least one of an as-built computing system 828, a design computing system 824, a robot computing system 818, and in-service applications. The as-built computing system 828 may also be referred to as an in-service computing system.

Figure 3:
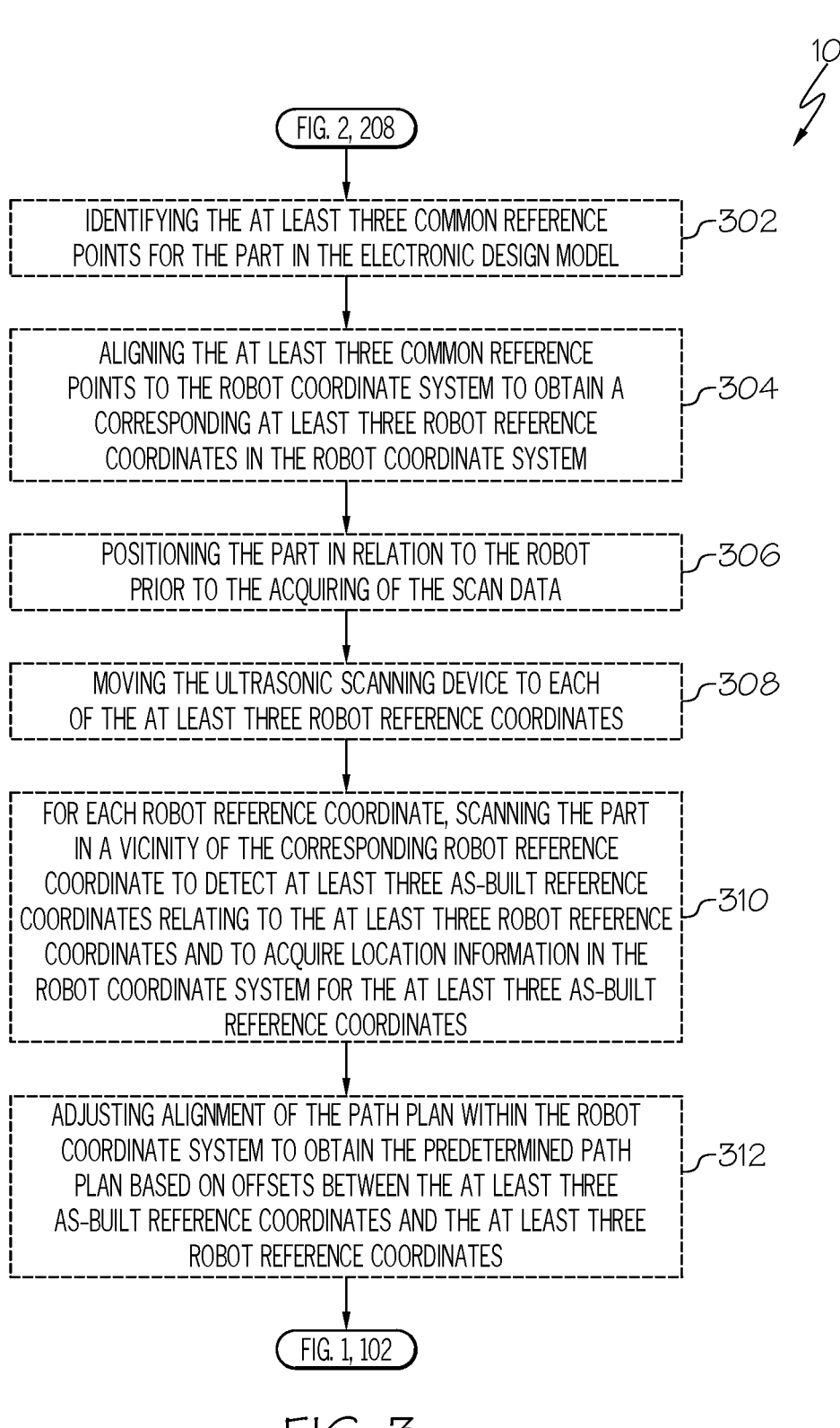
FIG. 3, in combination with FIGS. 1 and 2, is a flow diagram of yet another example of a method for associating test data for a part under test with an end item coordinate system.
Figure 4:
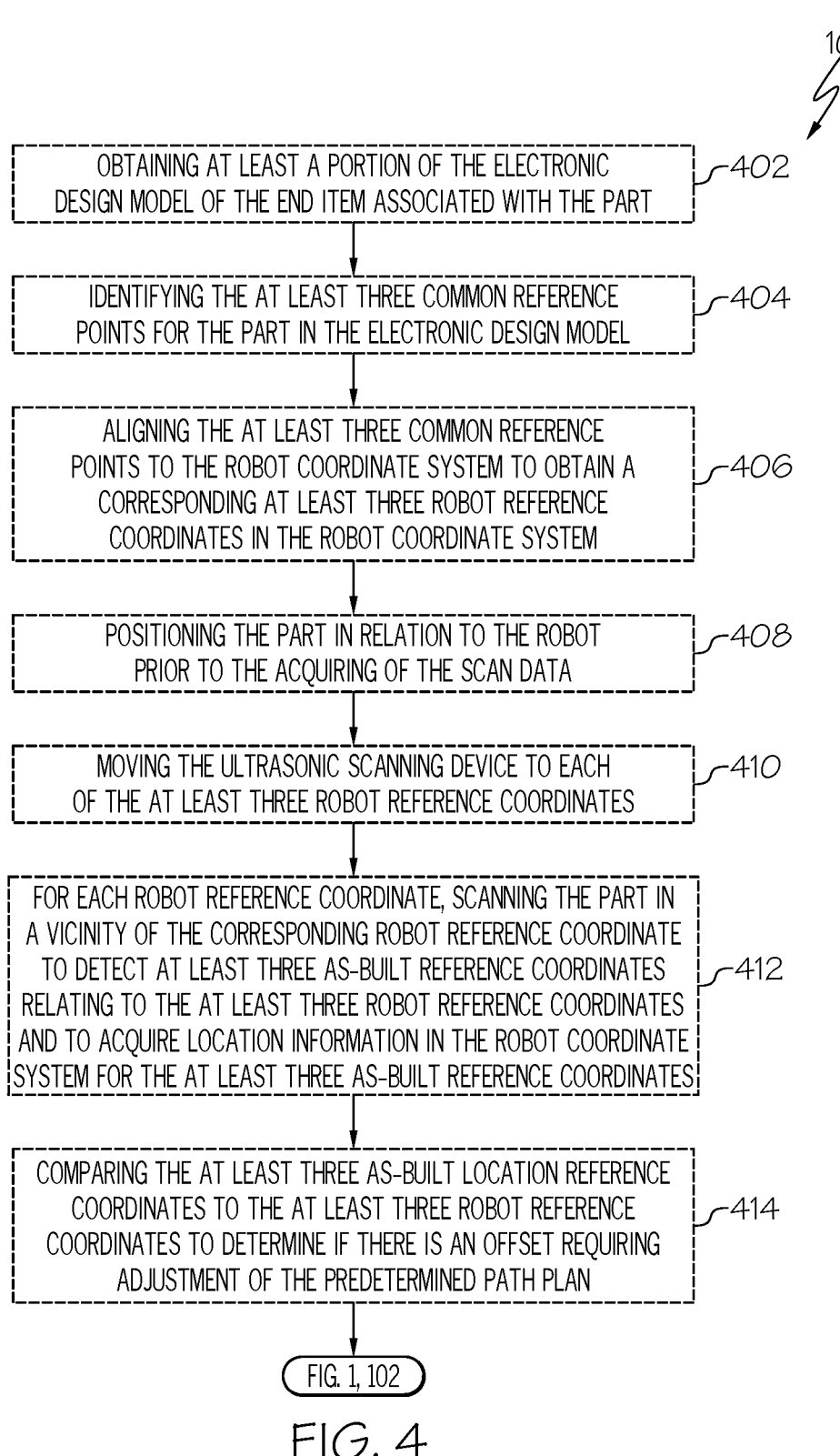
FIG. 4, in combination with FIG. 1, is a flow diagram of still another example of a method for associating test data for a part under test with an end item coordinate system.
Figure 5:
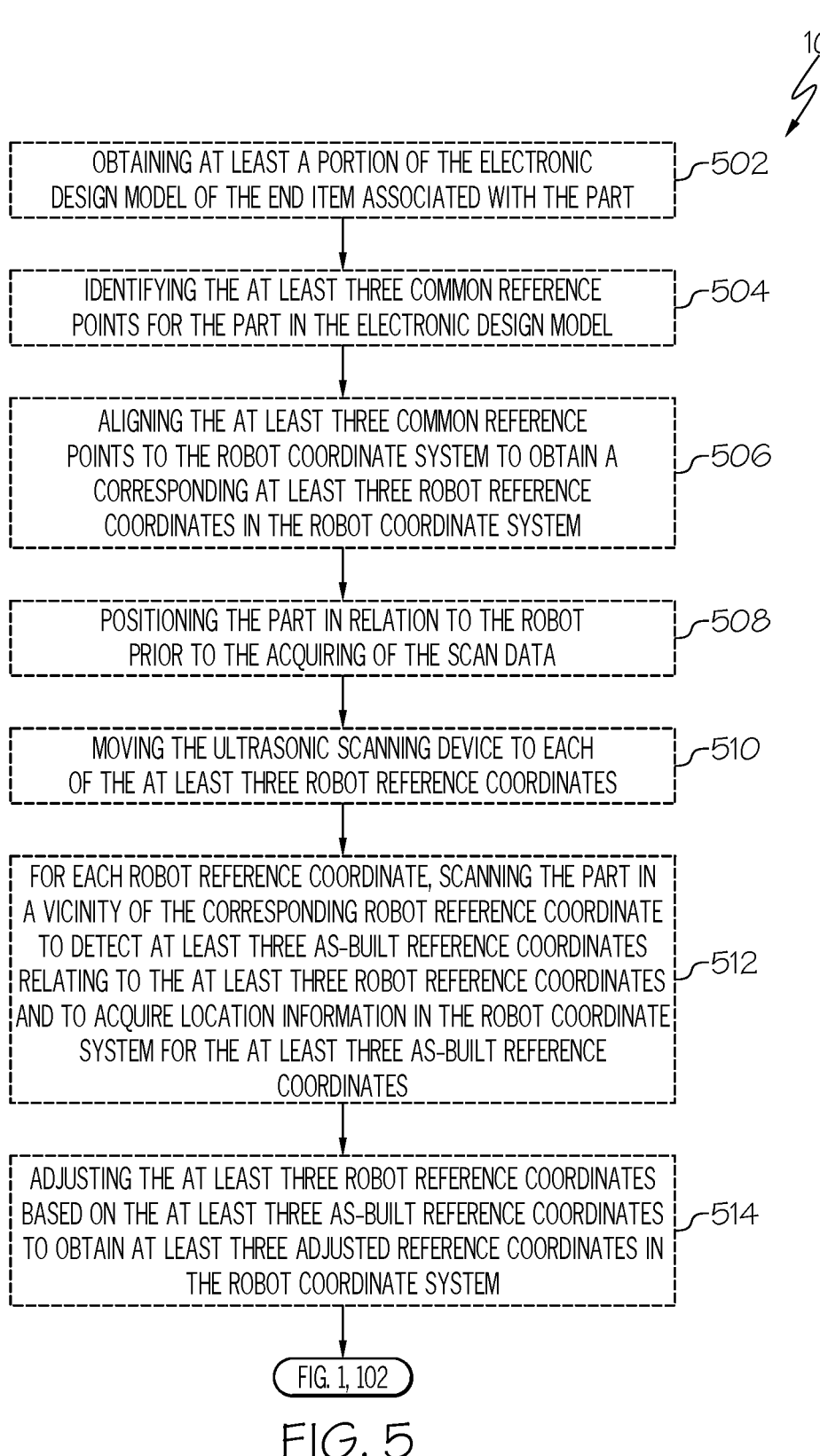
FIG. 5, in combination with FIG. 1, is a flow diagram of still yet another example of a method for associating test data for a part under test with an end item coordinate system.
Figure 8:
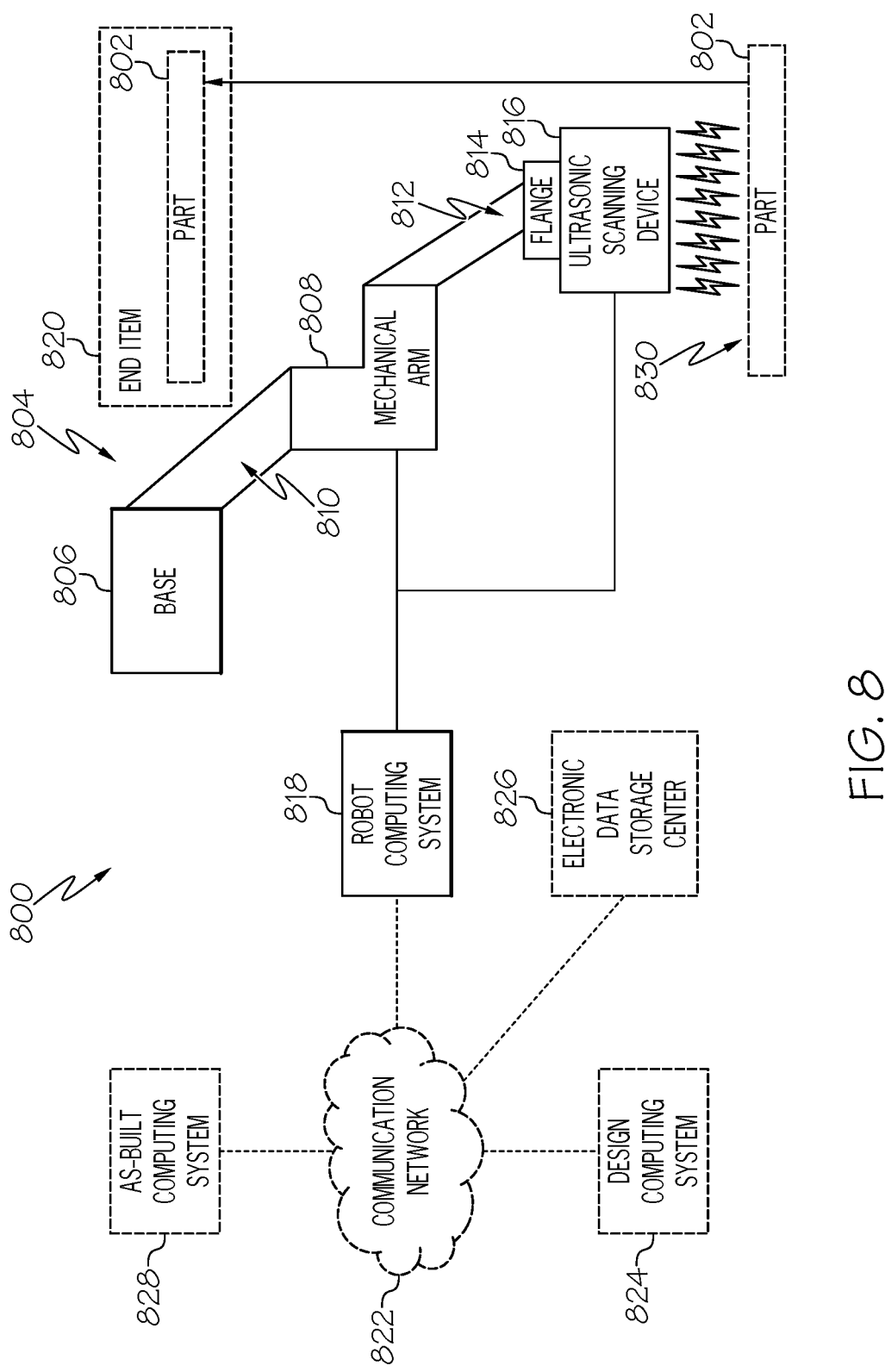
FIG. 8 is a functional block diagram of an example of a non-destructive inspection (NDI) system for associating test data for a part under test with an end item coordinate system.
Figure 9:
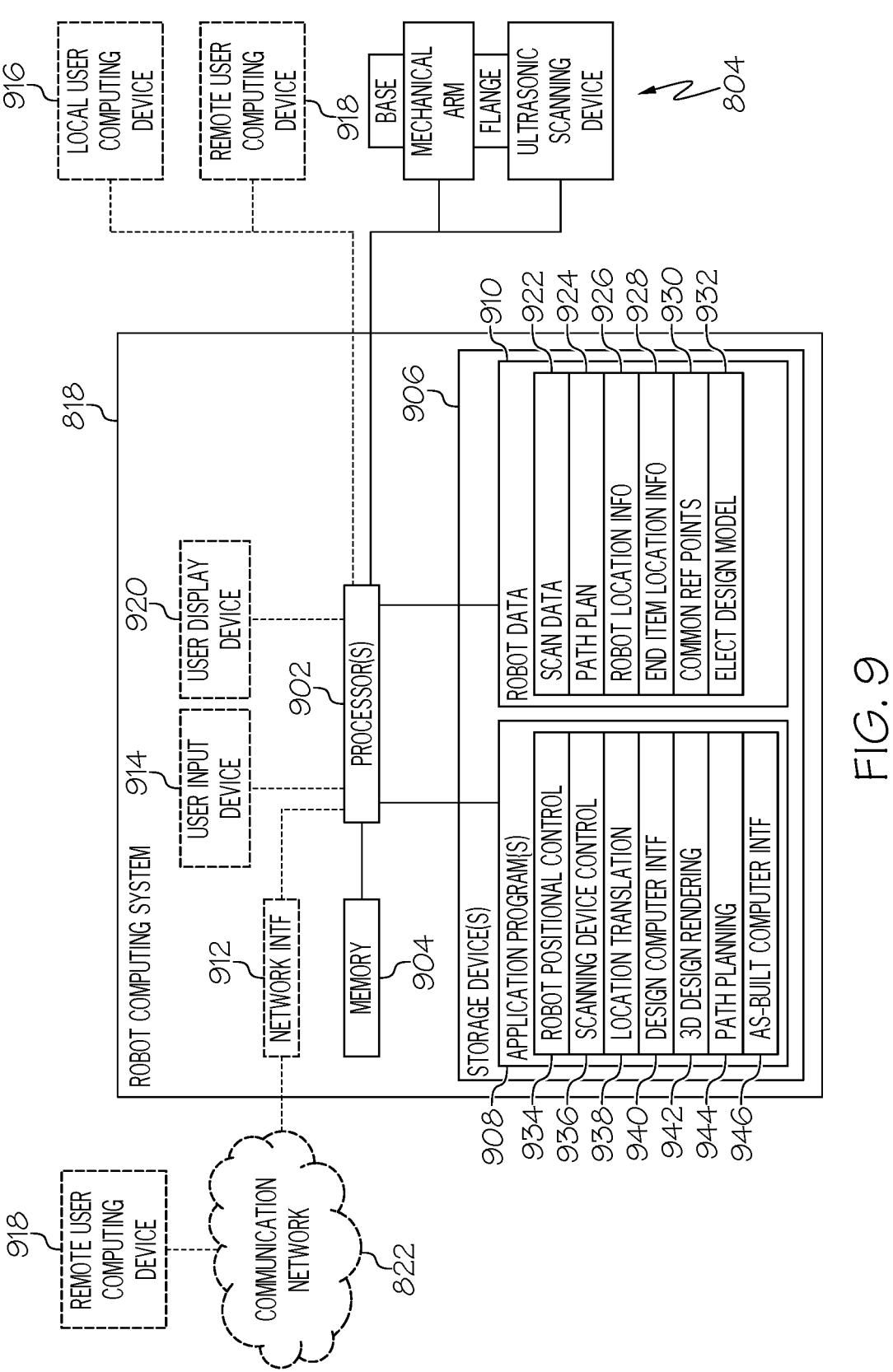
FIG. 9 is a functional block diagram of an example of the robot computing system shown in the NDI system of FIG. 8.
Figure 10:
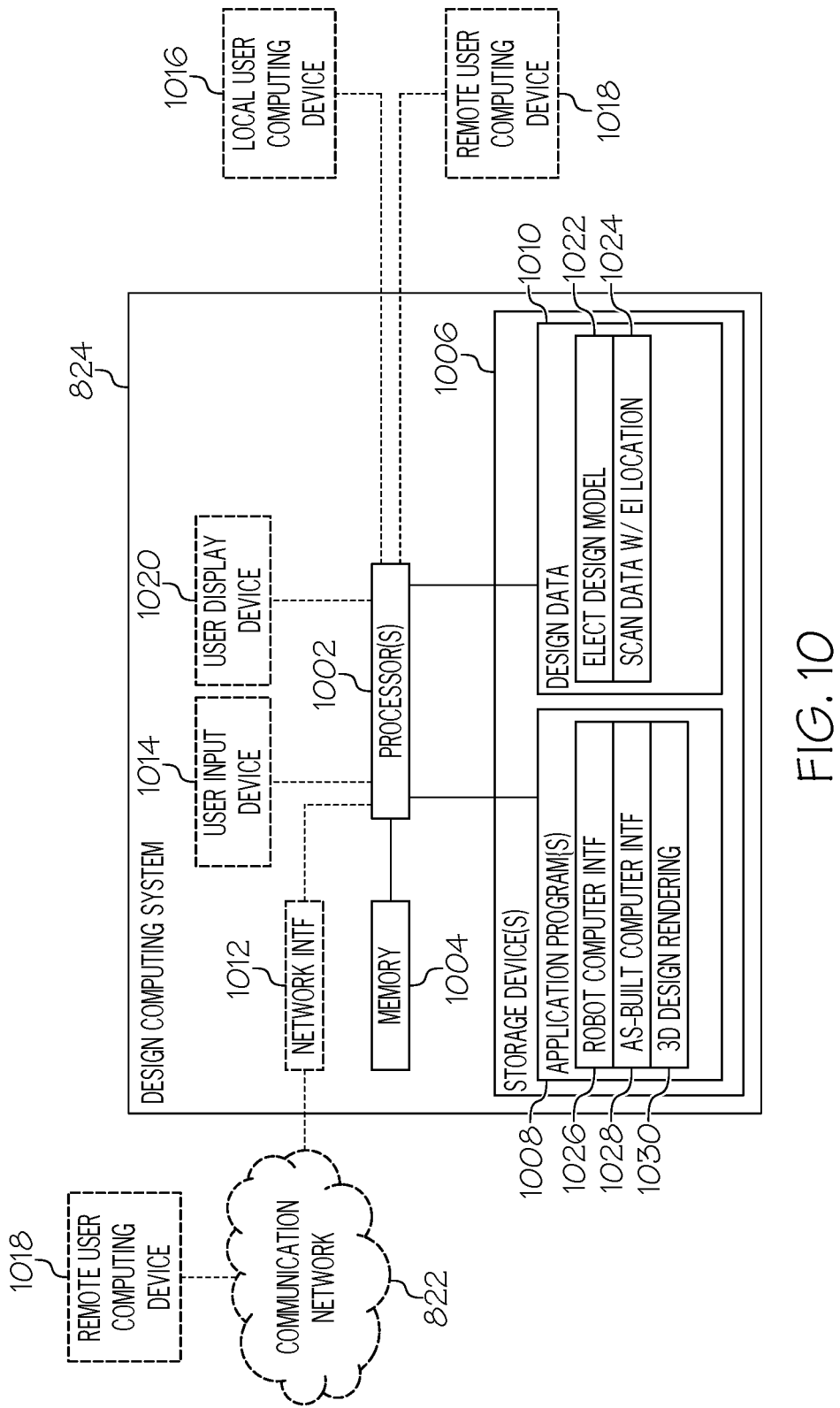
FIG. 10 is a functional block diagram of an example of the design computing system shown in the NDI system of FIG. 8.
Figure 11:
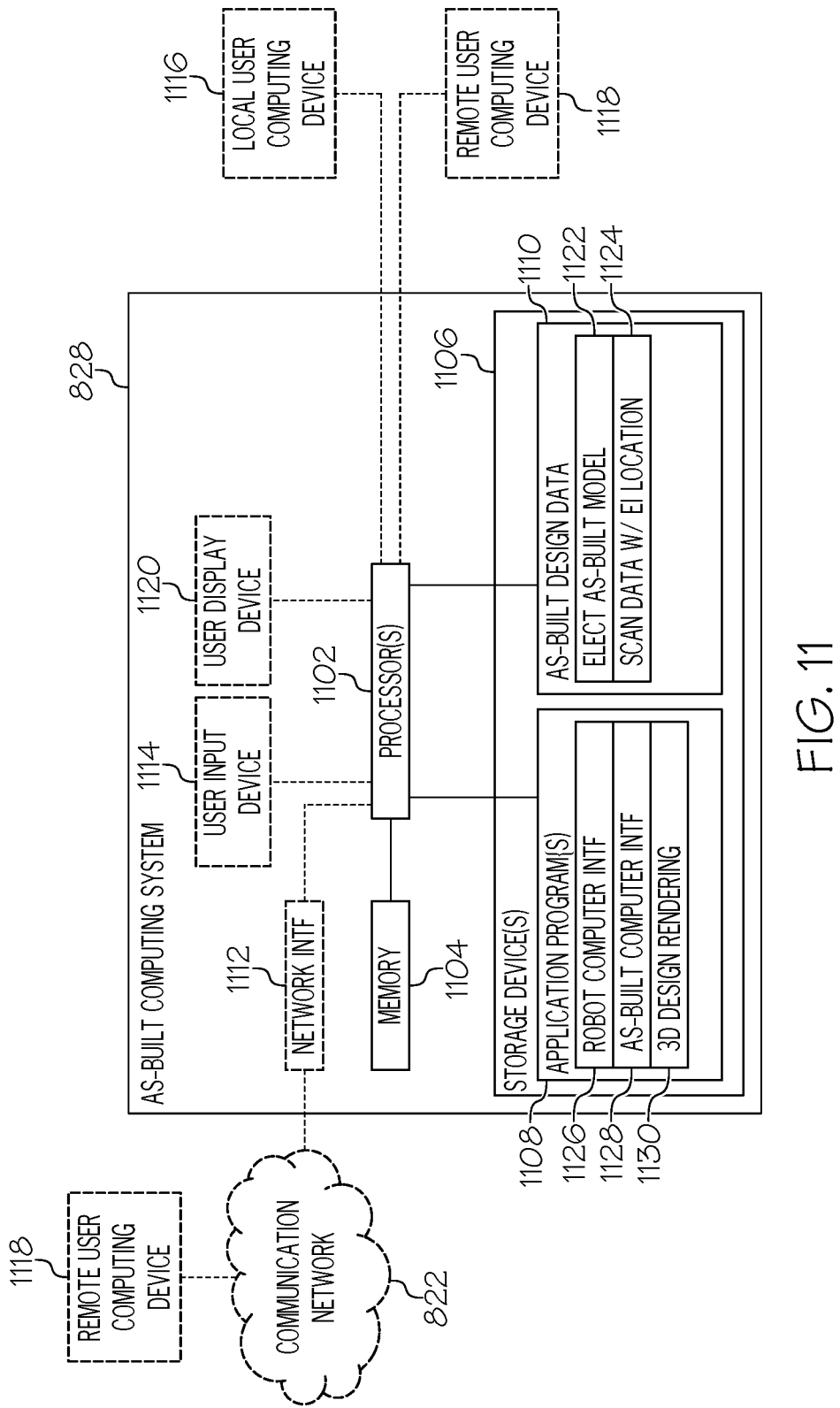
FIG. 11 is a functional block diagram of an example of the as-built computing system shown in the NDI system of FIG. 8.
Figure 12:
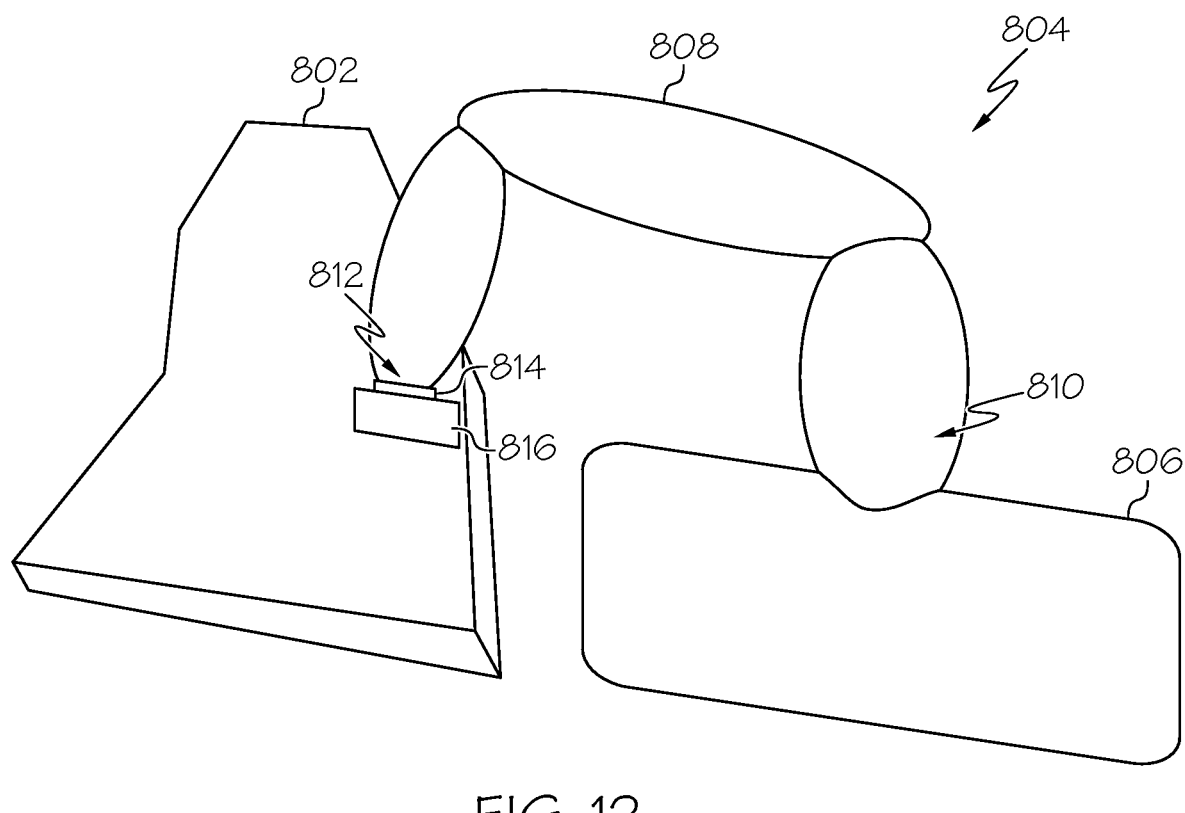
FIG. 12 is a functional diagram showing examples of the robot and part under test shown in the NDI system of FIG. 8.
Figure 13:
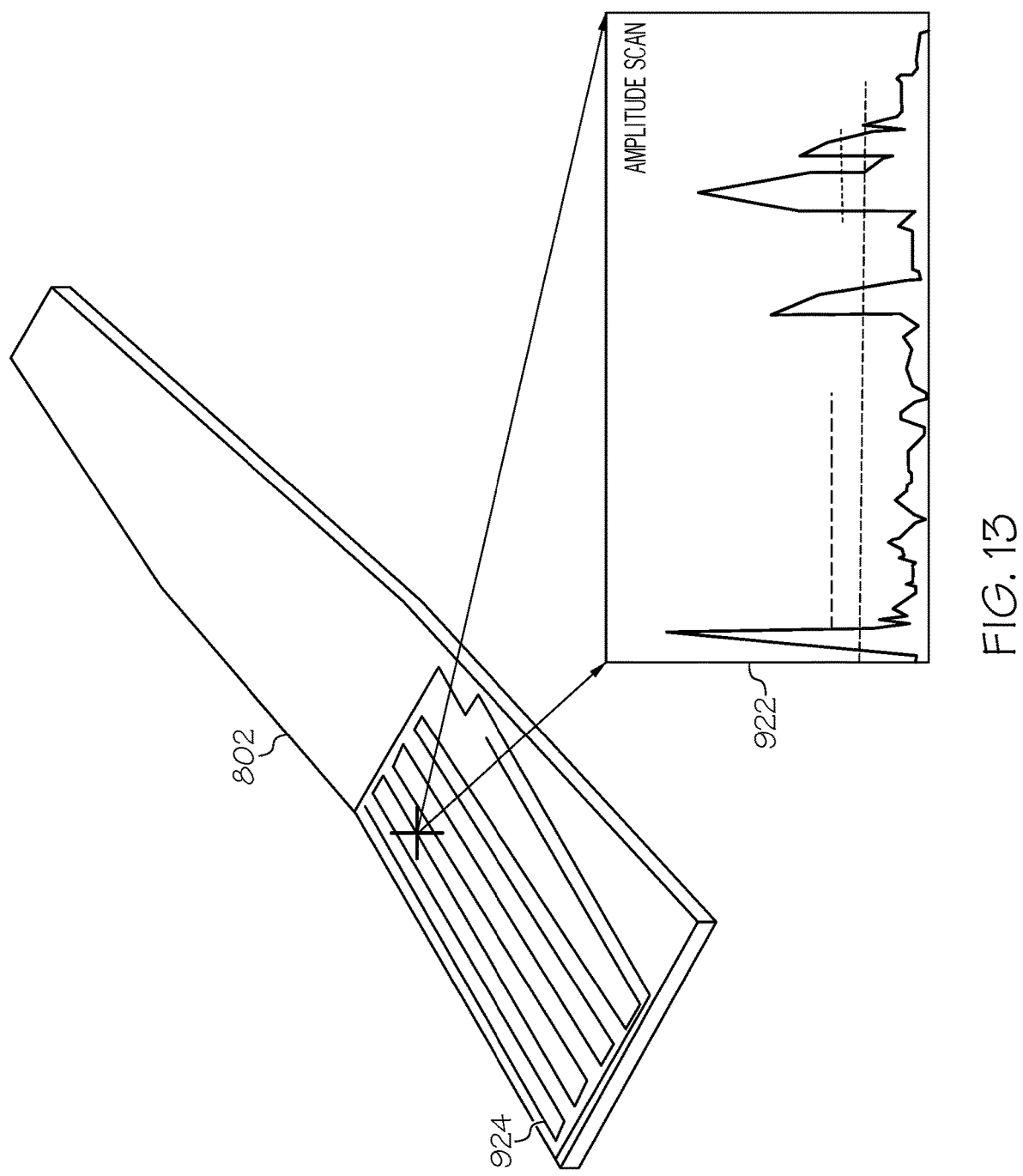
FIG. 13 is a functional diagram showing an example of the part under test shown in the NDI system of FIG. 8 and examples of the predetermined path plan and scan data identified in FIG. 1.

Referring generally to FIGS. 8-16, by way of examples, the present disclosure is directed to a non-destructive inspection (NDI) system 800 for associating test data for a part 802 with an end item coordinate system 1402 (see, e.g., FIG. 14). FIG. 8 discloses an example of the NDI system 800 that includes a robot 804 and a robot computing system 818. FIGS. 9-16 disclose various examples of the NDI system 800.

With reference again to FIGS. 8 and 9, in one or more examples, a non-destructive inspection (NDI) system 800 for associating test data for a part 802 under test with an end item coordinate system 1402 (see, e.g., FIG. 14) includes a robot 804 and a robot computing system 818. The robot 804 including a base 806, a mechanical arm 808 with a proximal end 810 secured to the base 806 and a distal end 812, a flange 814 movably secured to the distal end 812 of the mechanical arm 808 and an ultrasonic scanning device 816 secured to the flange 814. The robot computing system 818 is in operative communication with the robot 804 and configured to control movement of the mechanical arm 808 and operation of the ultrasonic scanning device 816. The robot computing system includes at least one processor 902 and associated memory 904 and at least one storage device 906 storing at least one application program 908 and robot data 910.

The robot computing system 818 and the robot 804, in conjunction with the at least one processor 902 running first application programs and accessing first robot data is configured to acquire scan data 922 during a plurality of scans of at least a portion of the part 802 of an end item 820 along a predetermined path plan 924 using the ultrasonic scanning device 816. In this example, the first application programs may include a robot positional control program 934 and a scanning device control program 936. The first robot data may include a path plan 924 and scan data 922.

The robot computing system 818 and the robot 804, in conjunction with the at least one processor 902 running second application programs and accessing second robot data is configured to record robot location information 926 associated with the scan data 922 acquired during the plurality of scans. In this example, the second application programs may include the robot positional control program 934. The second robot data may include the robot location information 926. The robot location information 926 is based at least in part on a robot coordinate system 1502 (see, e.g., FIG. 15) associated with the robot 804.

The robot computing system 818, in conjunction with the at least one processor 902 running third application programs and accessing third robot data is configured to translate the robot location information 926 for the robot coordinate system 1502 to end item location information 928 within the end item coordinate system 1402 based on at least three common reference points 930 in the predetermined path plan 924, an electronic design model 932 of the end item 820 within the end item coordinate system 1402, and the part 802. In this example, the third application programs may include a location translation program 938. The third robot data may include the scan data 922, common reference points 930, robot location information 926, electronic design model 932, and end item location information 928.

In another example of the NDI system 800, the robot computing system 818 also includes a network interface 912 in operative communication with the at least one processor 902 and configured to interface with a communication network 822. The robot computing system 818, in conjunction with the at least one processor 902 running fourth application programs and accessing fourth robot data is configured to obtain the electronic design model 932 of the end item 820 from a design computing system 824 via the communication network 822 and the network interface 912. In this example, the fourth application programs may include a design computer interface program 940. The fourth robot data may include the at least three common reference points 930 and electronic design model 932.

In this example, the robot computing system 818, in conjunction with the at least one processor 902 running the third application programs and accessing the third robot data is configured to: i) identify the at least three common reference points 930 for the part 802 in the electronic design model 932, ii) align the at least three common reference points 930 to the robot coordinate system 1502 to obtain a corresponding at least three robot reference coordinates in the robot coordinate system 1502, iii) for each robot location information 926 associated with the scan data 922, determine relationships between the corresponding robot location information 926 in the robot coordinate system 1502 and the robot reference coordinates, iv) obtain end item reference coordinates in the end item coordinate system 1402 for the at least three common reference points 930 from the electronic design model 932 and v) for each robot location information 926 associated with the scan data 922, translate the corresponding robot location information 926 to the end item location information 928 in the end item coordinate system 1402 based on the end item reference coordinates and an inverse of the relationships between the corresponding robot location information 926 and the robot reference coordinates. In this example, the third application programs may include the location translation program 938. The third robot data may include the scan data 922, common reference points 930, robot location information 926, electronic design model 932, and end item location information 928.

In yet another example of the NDI system 800, the robot computing system 818, in conjunction with the at least one processor 902 running fourth application programs and accessing fourth robot data is configured to link the scan data 922 from the plurality of scans with the corresponding end item location information 928 within the end item coordinate system 1402 based on translation of the robot location information 926 to the end item location information 928 by the robot computing system 818 such that each scan data 922 is associated with an end item location coordinate. In this example, the fourth application programs may include the location translation program 938. The fourth robot data may include the scan data 922, robot location information 926, and end item location information 928.

In a further example of the NDI system 800, the robot computing system 818, in conjunction with the at least one processor 902 running fifth application programs and accessing fifth robot data is configured to: i) receive a scan data query for at least one of an individual end item location coordinate, a plurality of end item location coordinates, and a range of end item location coordinates from one or more of a user input device 914, a local user computing device 916, and a remote user computing device 918, ii) process the scan data 922 in response to the scan data query to identify query results and iii) provide the query results to at least one of a display device 920, a messaging system, a storage device, and a rendering device. In this example, the fifth application programs may include the a local communication interface program, a remote communication interface program, a three-dimensional rendering program 942, a local display interface program, a messaging system interface program, a storage device interface program, and a rendering device interface program. The fifth robot data may include the scan data 922 and end item location information 928.

In still another example of the NDI system 800, the robot computing system 818 also includes a network interface 912 in operative communication with the at least one processor 902 and configured to interface with a communication network 822. The robot computing system 818, in conjunction with the at least one processor 902 running fourth application programs and accessing fourth robot data is configured to: i) obtain at least a portion of the electronic design model 932 of the end item 820 associated with the part 802 from a design computing system 824 via the communication network 822 and the network interface 912, ii) align the electronic design model 932 of the part 802 to the robot coordinate system 1502, iii) generate the path plan for the plurality of scans within the robot coordinate system 1502 based on the electronic design model 932, a predetermined test pattern grid for the part 802, and a predetermined distance between the ultrasonic scanning device 816 and a surface 830 of the part 802 and iv) align the path plan to the robot coordinate system 1502. In this example, the fourth application programs may include a design computer interface program 940, location translation program 938 and path planning program 944. The fourth robot data may include the electronic design model 932 and path plan 924.

In a further example of the NDI system 800, the robot computing system 818, in conjunction with the at least one processor 902 running the fourth application programs and accessing the fourth robot data is configured to: i) identify the at least three common reference points 930 for the part 802 in the electronic design model 932 and ii) align the at least three common reference points 930 to the robot coordinate system 1502 to obtain a corresponding at least three robot reference coordinates in the robot coordinate system 1502. In this example, the fourth application programs may include the location translation program 938. The fourth robot data may include the electronic design model 932 and common reference points 930.

In this example, the robot computing system 818 and the robot 804, in conjunction with the at least one processor 902 running the first application programs and accessing the first robot data is configured to: i) position the part 802 in relation to the robot 804 prior to the robot computing system 818 acquiring of the scan data 922, ii) move the ultrasonic scanning device 816 to each of the at least three robot reference coordinates, iii) for each robot reference coordinate, scan the part 802 in a vicinity of the corresponding robot reference coordinate to detect at least three as-built reference coordinates relating to the at least three robot reference coordinates and to acquire location information in the robot coordinate system 1502 for the at least three as-built reference coordinates and iv) adjust alignment of the path plan within the robot coordinate system 1502 to obtain the predetermined path plan 924 based on offsets between the at least three as-built reference coordinates and the at least three robot reference coordinates. In this example, the first application programs may include the robot position control program 934, scanning device control program 936 and path planning program 944. The first robot data may include the electronic design model 932, common reference points 930 and path plan 924.

In still yet another example of the NDI system 800, the robot computing system 818 also includes a network interface 912 in operative communication with the at least one processor 902 and configured to interface with a communication network 822. The robot computing system 818, in conjunction with the at least one processor 902 running fourth application programs and accessing fourth robot data is configured to: i) obtain at least a portion of the electronic design model 932 of the end item 820 associated with the part 802 from a design computing system 824 via the communication network 822 and the network interface 912, ii) identify the at least three common reference points 930 for the part 802 in the electronic design model 932 and iii) align the at least three common reference points 930 to the robot coordinate system 1502 to obtain a corresponding at least three robot reference coordinates in the robot coordinate system 1502. In this example, the fourth application programs may include the design computer interface program 940 and location translation program 938. The fourth robot data may include the electronic design model 932 and common reference points 930.

In this example, the robot computing system 818 and the robot 804, in conjunction with the at least one processor 902 running the first application programs and accessing the first robot data is configured to: i) position the part 802 in relation to the robot 804 prior to the robot computing system 818 acquiring of the scan data 922, ii) move the ultrasonic scanning device 816 to each of the at least three robot reference coordinates, iii) for each robot reference coordinate, scan the part 802 in a vicinity of the corresponding robot reference coordinate to detect at least three as-built reference coordinates relating to the at least three robot reference coordinates and to acquire location information in the robot coordinate system 1502 for the at least three as-built reference coordinates and iv) compare the at least three as-built reference coordinates to the at least three robot reference coordinates to determine if there is an offset requiring adjustment of the predetermined path plan 924. In this example, the first application programs may include the robot position control program 934, scanning device control program 936 and path planning program 944. The first robot data may include the electronic design model 932, common reference points 930 and path plan 924.

In another example of the NDI system 800, the robot computing system 818 also includes a network interface 912 in operative communication with the at least one processor 902 and configured to interface with a communication network 822. The robot computing system 818, in conjunction with the at least one processor 902 running fourth application programs and accessing fourth robot data is configured to: i) obtain at least a portion of the electronic design model 932 of the end item 820 associated with the part 802 from a design computing system 824 via the communication network 822 and the network interface 912, ii) identify the at least three common reference points 930 for the part 802 in the electronic design model 932 and iii) align the at least three common reference points 930 to the robot coordinate system 1502 to obtain a corresponding at least three robot reference coordinates in the robot coordinate system 1502. In this example, the fourth application programs may include the design computer interface program 940 and location translation program 938. The fourth robot data may include the electronic design model 932 and common reference points 930.

In this example, the robot computing system 818 and the robot 804, in conjunction with the at least one processor 902 running the first application programs and accessing the first robot data is configured to: i) position the part 802 in relation to the robot 804 prior to the robot computing system 818 acquiring of the scan data 922, ii) move the ultrasonic scanning device 816 to each of the at least three robot reference coordinates, iii) for each robot reference coordinate, scan the part 802 in a vicinity of the corresponding robot reference coordinate to detect at least three as-built reference coordinates relating to the at least three robot reference coordinates and to acquire location information in the robot coordinate system 1502 for the at least three as-built reference coordinates and iv) adjust the at least three robot reference coordinates based on the at least three as-built reference coordinates to obtain at least three adjusted reference coordinates in the robot coordinate system 1502. In this example, the first application programs may include the robot position control program 934 and scanning device control program 936. The first robot data may include the electronic design model 932 and common reference points 930.

In yet another example of the NDI system 800, the end item 820 includes a vehicle, an airplane, an aircraft, a vertical takeoff aircraft, a rotary wing aircraft, an automobile, an electric vehicle, a space vehicle, a satellite, a rocket, a missile, and/or a missile silo in any suitable combination. In still another example of the NDI system 800, the part 802 includes a thermoplastic composite part or any suitable part(s) in any suitable combination. In still yet another example of the NDI system 800, the ultrasonic scanning device 816 includes an ultrasonic sensor, an ultrasonic transducer, an ultrasonic transceiver, an ultrasonic sensor array, or any suitable ultrasonic scanning device in any suitable combination.

With reference again to FIG. 9, in one or more examples, a robot computing system 818 includes at least one processor 902 and associated memory 904 and at least one storage device 906. The at least one processor 902 is in operable communication with the robot 804 (see FIG. 8). The at least one storage device 906 is configured to store at least one application program 908 and robot data 910. The robot computing system 818 may also include a network interface 912 configured to interface with a communication network 822. The communication network 822 may include one or more wired networks, one or more wireless networks, or any suitable communication network in any suitable combination. The robot computing system 818 may also include any combination of a user input device 914 (e.g., keyboard, touchscreen, mouse, etc.), a local user computing device 916, a remote user computing device 918, and a display device 920. In one example, the remote user computing device 918 may be in communication with the at least one processor 902 via the communication network 822 and network interface 912.

The robot data 910 stored in the at least one storage device 906 may include, for example, scan data 922, a path plan 924, robot location information 926, end item location information 928, at least three common reference points 930, and an electronic design model 932. The robot location information 926 is expressed in relation to a robot coordinate system 1502 (see, e.g., FIG. 15). The end item location information 928 is expressed in relation to an end item coordinate system 1402 (see, e.g., FIG. 14). The at least three common reference points 930 are common to the robot coordinate system 1502, end item coordinate system 1402, and part 802. The at least three common reference points 930 may also be common to the predetermined path plan 924. The electronic design model 932 may be representative of the part 802, end item 820, or any portion of the part 802 or end item 820. The robot data 910 may include any combination of the data identified above and may include additional data.

The at least one application program 908 stored in the at least one storage device 906 may include, for example, a robot positional control program 934, a scanning device control program 936, a location translation program 938, a design computer interface program 940, a three-dimensional rendering program 942, a path planning program 944, and an as-built computer interface program 946. The at least one application program 908 may include any combination of the application programs identified above and may include additional application programs.

With reference again to FIG. 10, in one or more examples, a design computing system 824 includes at least one processor 1002 and associated memory 1004 and at least one storage device 1006. The at least one storage device 1006 is configured to store at least one application program 1008 and design data 1010. The design computing system 824 may also include a network interface 1012 configured to interface with a communication network 822. The communication network 822 may include one or more wired networks, one or more wireless networks, or any suitable communication network in any suitable combination. The design computing system 824 may also include any combination of a user input device 1014 (e.g., keyboard, touchscreen, mouse, etc.), a local user computing device 1016, a remote user computing device 1018, and a user display device 1020. In one example, the remote user computing device 1018 may be in communication with the at least one processor 1002 via the communication network 822 and network interface 1012.

The design data 1010 stored in the at least one storage device 1006 may include, for example, an electronic design model 1022 and scan data with end item location information 1024. The electronic design model 1022 may be representative of the part 802, end item 820, or any portion of the part 802 or end item 820. The end item location information associated with the scan data is expressed in relation to an end item coordinate system 1402 (see, e.g., FIG. 14). The design data 1010 may include any combination of the data identified above and may include additional data.

The at least one application program 1008 stored in the at least one storage device 1006 may include, for example, a robot computer interface program 1026, an as-built computer interface program 1028 and a three-dimensional rendering program 1030. The at least one application program 1008 may include any combination of the application programs identified above and may include additional application programs.

With reference again to FIG. 11, in one or more examples, an as-built computing system 828 includes at least one processor 1102 and associated memory 1104 and at least one storage device 1106. The as-built computing system 828 may also be referred to as an in-service computing system. The at least one storage device 1106 is configured to store at least one application program 1108 and as-built design data 1110. The as-built computing system 828 may also include a network interface 1112 configured to interface with a communication network 822. The communication network 822 may include one or more wired networks, one or more wireless networks, or any suitable communication network in any suitable combination. The as-built computing system 828 may also include any combination of a user input device 1114 (e.g., keyboard, touchscreen, mouse, etc.), a local user computing device 1116, a remote user computing device 1118, and a user display device 1120. In one example, the remote user computing device 1118 may be in communication with the at least one processor 1102 via the communication network 822 and network interface 1112.

The as-built design data 1110 stored in the at least one storage device 1106 may include, for example, an electronic as-built model 1122 and scan data with end item location information 1124. The electronic as-built model 1122 may be representative of an as-built version of the part 802, an as-built version of the end item 820, or any portion of the as-built version of the part 802 or the end item 820. The end item location information associated with the scan data is expressed in relation to an end item coordinate system 1402 (see, e.g., FIG. 14). The as-built design data 1110 may include any combination of the data identified above and may include additional data.

The at least one application program 1108 stored in the at least one storage device 1106 may include, for example, a robot computer interface program 1126, a design computer interface program 1128 and a three-dimensional rendering program 1130. The at least one application program 1108 may include any combination of the application programs identified above and may include additional application programs.

With reference again to FIG. 12, a functional diagram shows an example of the robot 804 and part 802 under test shown in the NDI system 800 of FIG. 8. The robot 804 includes a base 806, a mechanical arm 808 with a proximal end 810 secured to the base 806 and a distal end 812, a flange 814 movably secured to the distal end 812 of the mechanical arm 808 and an ultrasonic scanning device 816 secured to the flange 814. The robot 804 is shown with the ultrasonic scanning device 816 positioned in relation to the part 802 for a scanning operation.

With reference again to FIG. 13, a functional diagram shows an example of the part 802 under test shown in the NDI system 800 of FIG. 8 and examples of the predetermined path plan 924 and an example of the scan data 922 identified in FIG. 1. In this example, the scan data 922 for a scan data point (+) includes an amplitude scan. The amplitude scan may also be referred to as an A-scan. An ultrasonic A-scan shows waveform data representing the echo signal received after one ultrasonic pulse.

With reference again to FIG. 14, a functional diagram shows an example of the end item 820 shown in the NDI system 800 of FIG. 8 and examples of the at least three common reference points 930 and end item coordinate system 1402 identified in FIG. 1. In this example, the end item 820 is an aircraft, the at least three common reference points 930 are determinate assembly holes in the wing and an origin for the end item coordinate system 1402 is at the nose of the aircraft. The diagram identifies a location for one of the at least three common reference points 930 in relation to the end item coordinate system 1402.

With reference again to FIG. 15, a functional diagram shows examples of the robot 804 and end item 820 shown in the NDI system 800 of FIG. 8 and examples of the robot coordinate system 1502 and at least three common reference points 930 identified in FIG. 1. The robot 804 includes a base 806, a mechanical arm 808, a flange 814 and an ultrasonic scanning device 816 secured to the flange 814. In this example, the end item 820 is an aircraft, the at least three common reference points 930 are determinate assembly holes in the wing and an origin for the robot coordinate system 1502 is at a central point for the ultrasonic scanning device 816. The diagram identifies a technique for representing the at least three common reference points 930 on the end item 820 in relation to the robot coordinate system 1502.

With reference again to FIG. 16, a functional diagram shows an example of the robot 804 shown in the NDI system 800 of FIG. 8 and examples of the predetermined path plan 924, scan data 922, and robot coordinate system 1502 identified in FIG. 1. The robot 804 includes a base 806, a mechanical arm 808, a flange 814 and an ultrasonic scanning device 816 secured to the flange 814. In this example, the origin for the robot coordinate system 1502 is at a central point for the ultrasonic scanning device 816 and a scan data point (·) is identified for the scan data 922. The diagram identifies a technique for representing the location of the scan data point (·) in relation to the robot coordinate system 1502.

With reference again to FIGS. 1-16, in one or more examples, a method 100 for associating test data for a part 802 under test with an end item coordinate system 1402 may include creating a path plan for scanning the part 802, locating the part 802 in an NDI testing environment, scanning the part 802, translating scan data 922 from the NDI testing environment to the end item coordinate system 1402, and presenting the scan data 922 in relation to the end item coordinate system 1402.

In one example, creating the path plan includes obtaining an electronic design model 932 of part 802 under test for use by a path planning program 944. The at least three common reference points 930 (e.g., determinate assembly holes) that are on the part 802 and in the electronic design model 932 are identified. The path planning program 944 uses the at least three common reference points 930 to align the electronic design model 932 of the part 802 to a robot coordinate system 1502. Then, the path planning program 944 designs the path plan for the part 802 under test based on contours and other three-dimensional aspects of the part 802. The path plan is designed so the flange 814 of the robot 804 maintains a predetermined constant distance from the surface of the part 802. Alternatively, the predetermined distance may be based on a central point of the ultrasonic scanning device 816 instead of the flange 814. The path plan may be based on a predetermined grid pattern (e.g., 2 mm between sequential grid points) such that the flange 814 would move through the grid pattern as the part 802 is scanned. The path planning program 944 aligns the path plan to the robot coordinate system 1502 to form the predetermined path 924. The x, y, z coordinates of the at least three common reference points 930 relative to robot coordinate system 1502 and the predetermined path plan 924 are stored for subsequent scanning.

In another example, locating the part 802 in the NDI testing environment includes bringing part 802 under test to the NDI environment. The robot 804 is moved to use the ultrasonic scanning device 816 to locate the at least three common reference points 930 on the part 802. The positions of the at least three common reference points 930 in relation to the robot coordinate system 1502 are recorded. The predetermined path plan 924 for scanning the part 802 is loaded into the robot computing system 818. The path planning program 944 is used to offset the coordinates for the predetermined path plan 924 in the robot coordinate system 1502 based on difference between locations of the at least three common reference points 930 in the predetermined path plan 924 and actual locations detected on the part 802.

In yet another example, the robot computing system 818 runs the robot positional control program 934 and the scanning device control program 936 using the predetermined path plan 924 to scan the part 802 in view of the corrected coordinates for the scan data points. Scan data 922 is collected by the ultrasonic scanning device 816 attached to the flange 814 of the robot 804. The scan data 922 is acquired as the robot 804 moves the ultrasonic scanning device 816 along the predetermined path plan 924. For example, the scan data 922 is collected every time the flange moves a predetermined distance (e.g., 2 mm) along the surface of the part 802. Positional information for the flange 814 is recorded for each scan data point.

In still another example, translating the scan data may be performed after the scanning is complete or as the scanning is being performed. After scanning is finished, the scan data 922 is stored in the at least one storage device 906. At this stage, there is a scan data point stored for every sample in the grid pattern of the predetermined path plan 424. Robot location information 926 is also stored for every sample. In conjunction with the translating, end item location information 928 is obtained from the electronic design model 932 for the at least three common reference points 930 that were used to align the robot coordinate system 1502. For every scan data point in the grid pattern, a transformation is applied to the robot location information 926 for the flange 814 in relation to the corresponding scan. The transformation may be the dot product of the end item coordinate system 1402 relative to the end item location information 928 for the at least three common reference points 930 multiplied by the robot location information 926 for the at least three common reference points 930 relative to the robot coordinate system 1502.

In still yet another example, presenting the scan data 922 includes tying the scan data 922 to the end item location information 928 at the pixel level. This may include tying the end item location information 928 relative to the robot location information 926 or vice versa. The scan data 922 can also be mapped to the electronic design model 932 based on the end item location information 928.

Referring generally to FIGS. 8, 9, 17A, 17B and 18-21, by way of examples, the present disclosure is directed to a method 1700 for integrating adjacent sets of test data for a part 802 under test in an electronic design model 932. FIGS. 17A and 17B disclose an example of the method 1700 that includes acquiring 1702, 1708 scan data 922 for adjacent portions of the part, recording 1704, 1710 location information associated with the scan data 922, translating 1706, 1712 the robot location information 926 for the adjacent sets of scan data 922 to end item location information 928 within the end item coordinate system 1402 (see, e.g., FIG. 14), and processing 1714 the adjacent sets of end item location information 928 to identify overlapping scan data points. FIGS. 18-21 disclose various other examples of the method 1700.

With reference again to FIGS. 8, 9, 17A and 17B, in one or more examples, a method 1700 for integrating adjacent sets of test data for a part 802 under test in an electronic design model 932 includes acquiring 1702 first scan data 922 during a first plurality of scans of at least a first portion of the part 802 of an end item 820 along a predetermined first path plan 924 using a first ultrasonic scanning device 816 of a first robot 804. The first ultrasonic scanning device 816 is controlled by a first robot computing system 818. At 1704, first robot location information 926 associated with the first scan data 922 acquired during the first plurality of scans is recorded. The first robot location information 926 is based at least in part on a first robot coordinate system 1502 (see, e.g., FIG. 15) associated with the first robot 804. At 1706, the first robot location information 926 for the first robot coordinate system 1502 is translated to first end item location information 928 within an end item coordinate system 1402 (see, e.g., FIG. 14) based on at least three common reference points 930 in the predetermined first path plan 924, an electronic design model 932 of the end item 820, and the part 802. At 1708, second scan data 922 is acquired during a second plurality of scans of at least a second portion of the part 802 along a predetermined second path plan 924 using a second ultrasonic scanning device 816 of a second robot 804. The second ultrasonic scanning device 816 is controlled by a second robot computing system 818. At 1710, second robot location information 926 associated with the second scan data 922 acquired during the second plurality of scans is recorded. The second robot location information 926 is based at least in part on a second robot coordinate system 1502 associated with the second robot 804. At 1712, the second robot location information 926 for the second robot coordinate system 1502 is translated to second end item location information 928 within the end item coordinate system 1402 based on at least three common reference points 930 in the predetermined second path plan 924, the electronic design model 932 of the end item 820, and the part 802. At 1714, the first end item location information 928 and the second end item location information 928 is processed to identify overlapping scan data points in the first scan data 922 and second scan data 922.

With reference again to FIGS. 8, 9, 17A, 17B and 18, in another example, the method 1700 continues from 1714 of FIG. 17B to 1802 of FIG. 18 where the first end item location information 928 and the second end item location information 928 is compared for the overlapping scan data points to identify instances in which the first end item location information 928 and the second end item location information 928 match.

In a further embodiment, the method 1700 also includes merging 1804 the first scan data 922 associated with the first end item location information 928 with the second scan data 922 associated with the second end item location information 928 to form merged scan data associated with merged end item location information where there are no matches for the overlapping scan data points.

With reference again to FIGS. 8, 9, 17A, 17B and 19, in another example, the method 1700 continues from 1714 of FIG. 17B to 1902 of FIG. 19 with, for each scan data point where the first end item location information 928 and the second end item location information 928 match, retaining the first scan data 922 and discarding the second scan data 922 where the first scan data 922 is more recent than the second scan data 922. Otherwise, retaining the second scan data 922 and discarding the first scan data 922. At 1904, for each scan data point where the first end item location information 928 and the second end item location information 928 do not match, the first scan data 922 and the second scan data 922 are retained. At 1906, the first scan data 922 that was retained and the corresponding first end item location information 928 with the second scan data 922 that was retained and the corresponding second end item location information 928 is merged to form merged scan data associated with merged end item location information.

With reference again to FIGS. 8, 9, 17A, 17B and 20, in another example, the method 1700 continues from 1714 of FIG. 17B to 2002 of FIG. 20 where, for each scan data point where the first end item location information 928 and the second end item location information 928 match, the first scan data 922 and the second scan data 922 are analyzed to identify certain duplicate data that appears in both, to identify certain scan data that appears in the first scan data 922 or the second scan data 922 but not both, and to identify certain scan data that appears in both the first scan data 922 and the second scan data 922 but is amplified in the first scan data 922 or the second scan data 922. At 2004, for each scan data point in which certain duplicate data is identified, the certain duplicate data is discarded from the first scan data 922 or the second scan data 922. At 2006, for each scan data point in which certain scan data appears in the first scan data 922 or the second scan data 922 but not both, the certain scan data is retained in the first scan data 922 or the second scan data 922. At 2008, for each scan data point in which certain scan data appears in both the first scan data 922 and the second scan data 922 but is amplified in the first scan data 922 or the second scan data 922, the process continues with retaining the certain scan data that is amplified in the first scan data 922 or the second scan data 922 and discarding the certain scan data that is not amplified in the second scan data 922 or the first scan data 922. At 2010, for each scan data point where the first end item location information 928 and the second end item location information 928 match, the first scan data 922 that is retained and the second scan data 922 that is retained are summed to form summed scan data associated with the end item location information 928 that was matched.

With reference again to FIGS. 8, 9, 17A, 17B, 20 and 21, in another example, the method 1700 continues from 2010 of FIGS. 20 to 2102 of FIG. 21 with, for each scan data point where the first end item location information 928 and the second end item location information 928 do not match, retaining the first scan data 922 and the second scan data 922. At 2104, the summed scan data and the corresponding end item location information 928 that was matched with i) the first scan data 922 that was retained and the corresponding first end item location information 928 and ii) the second scan data 922 that was retained and the corresponding second end item location information 928 are merged to form merged scan data associated with merged end item location information.

Examples of the methods 100, 1700 and the NDI system 800 may be related to, or used in the context of workpiece (e.g., part) fabrication for aircraft manufacturing. Although an aircraft example is described, the examples and principles disclosed herein may be applied to other products in the aerospace industry and other industries, such as the automotive industry, the space industry, the construction industry, and other design and manufacturing industries. Accordingly, in addition to aircraft, the examples and principles disclosed herein may apply to stamp forming workpieces to form an assembly for other types of vehicles (e.g., land vehicles, marine vehicles, space vehicles, etc.), stand-alone structures, high-traffic surfaces, and other high-contact surfaces.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C;

four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represents a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

In FIGS. 1-7, 17A, 17B and 18-21, referred to above, the blocks may represent operations, steps, and/or portions thereof, and lines connecting the various blocks do not imply any particular order or dependency of the operations or portions thereof. It will be understood that not all dependencies among the various disclosed operations are necessarily represented. FIGS. 1-7, 17A, 17B and 18-21 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

FIGS. 8-16, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 8-16, referred to above, need be included in every example and not all elements, features, and/or components described herein are necessarily depicted in each illustrative example. Accordingly, some of the elements, features, and/or components described and illustrated in FIGS. 8-16 may be combined in various ways without the need to include other features described and illustrated in FIGS. 8-16, other drawing figures, and/or the accompanying disclosure, even though such combination or combinations are not explicitly illustrated herein. Similarly, additional features not limited to the examples presented, may be combined with some or all the features shown and described herein. Unless otherwise explicitly stated, the schematic illustrations of the examples depicted in FIGS.

8-16, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 8-16, and such elements, features, and/or components may not be discussed in detail herein with reference to each of FIGS. 8-16. Similarly, all elements, features, and/or components may not be labeled in each of FIGS. 8-16, but reference numerals associated therewith may be utilized herein for consistency.

Further, references throughout the present specification to features, advantages, or similar language used herein do not imply that all the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but does not necessarily, refer to the same example.

Figure 22:
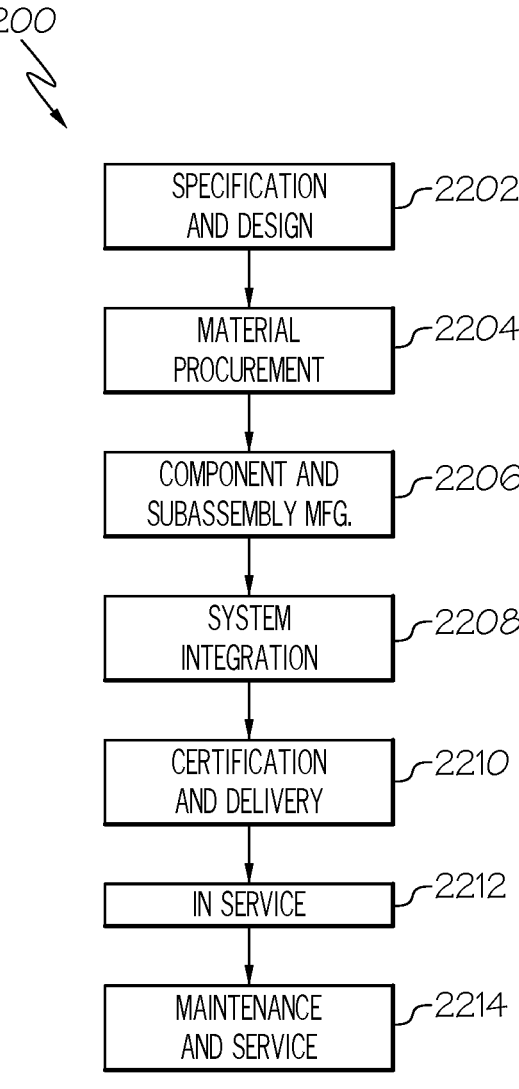
FIG. 22 is a block diagram of aircraft production and service methodology.
Figure 23:
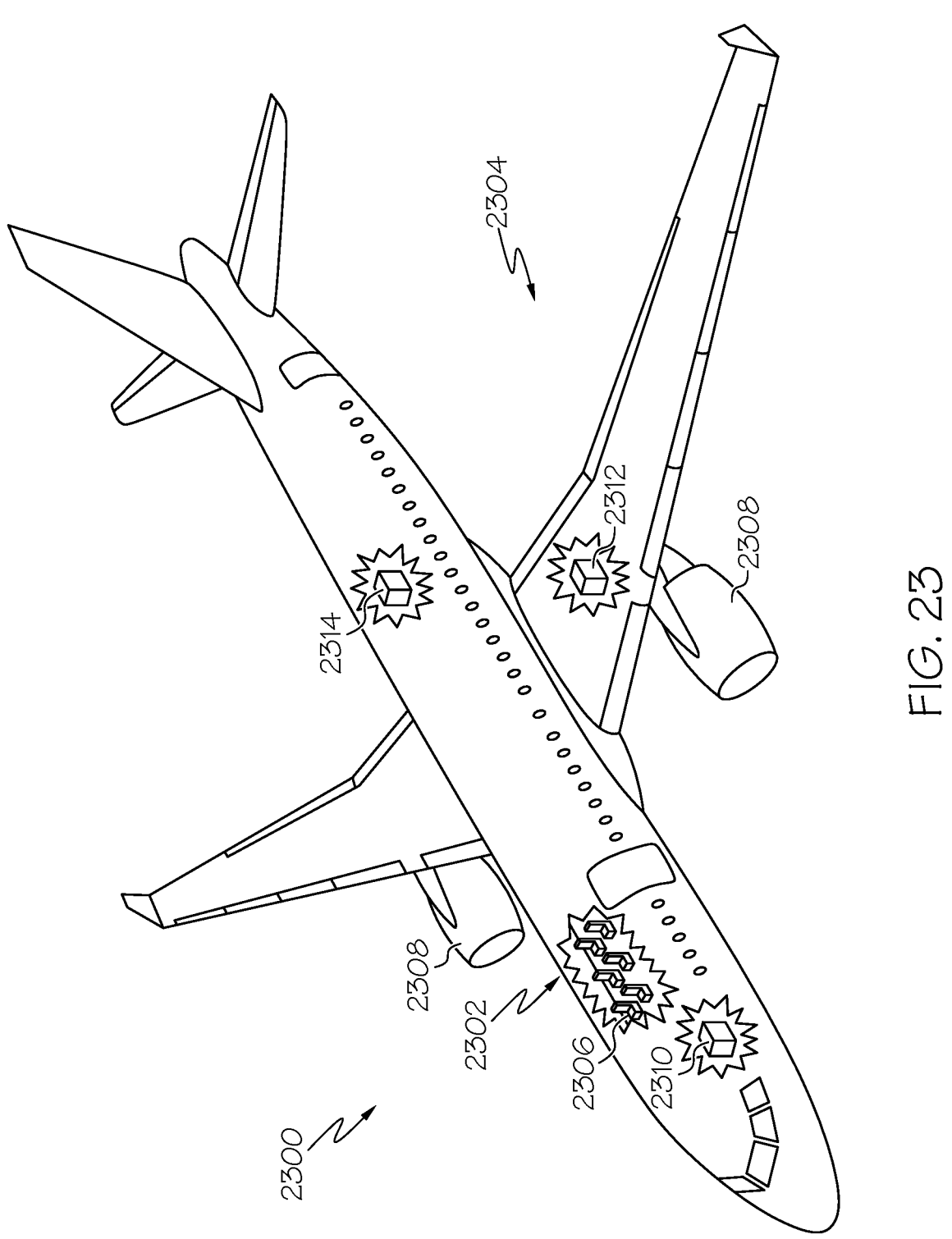
FIG. 23 is a schematic illustration of an aircraft.

Examples of the subject matter disclosed herein may be described in the context of aircraft manufacturing and service method 2200 as shown in FIG. 22 and aircraft 2300 as shown in FIG. 23. In one or more examples, the disclosed methods and systems for associating test data for a part under test with an end item coordinate system may be used in aircraft manufacturing. During pre-production, the service method 2200 may include specification and design (block 2202) of aircraft 2300 and material procurement (block 2204). During production, component and subassembly manufacturing (block 2206) and system integration (block 2208) of aircraft 2300 may take place. Thereafter, aircraft 2300 may go through certification and delivery (block 2210) to be placed in service (block 2212). While in service, aircraft 22300 may be scheduled for routine maintenance and service (block 2214). Routine maintenance and service may include modification, reconfiguration, refurbishment, etc. of one or more systems of aircraft 2300.

Each of the processes of the service method 2200 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 23, aircraft 2300 produced by the service method 2200 may include airframe 2302 with a plurality of high-level systems 2304 and interior 2306. Examples of high-level systems 2304 include one or more of propulsion system 2308, electrical system 2310, hydraulic system 2312, and environmental system 2314. Any number of other systems may be included. Although an aerospace example is shown, the principles disclosed herein may be applied to other industries, such as the automotive industry. Accordingly, in addition to aircraft 2300, the principles disclosed herein may apply to other vehicles, e.g., land vehicles, marine vehicles, space vehicles, etc.

The disclosed systems and methods for associating test data for a part under test with an end item coordinate system may be employed during any one or more of the stages of the manufacturing and service method 2200. For example, components or subassemblies corresponding to component and subassembly manufacturing (block 2206) may be fabricated or manufactured in a manner similar to components or subassemblies produced while aircraft 2300 is in service (block 2212). Also, one or more examples of the system(s), method(s), or combination thereof may be utilized during production stages (block 2206 and block 2208), for example, by substantially expediting assembly of or reducing the cost of aircraft 2300. Similarly, one or more examples of the system or method realizations, or a combination thereof, may be utilized, for example and without limitation, while aircraft 2300 is in service (block 2212) and/or during maintenance and service (block 2214).

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the methods 100, 1700 and the NDI system 800 have been shown and described, modifications may occur to those skilled in the art upon reading the specification. The present application includes such modifications and is limited only by the scope of the claims.

What is claimed is:

1. A method for associating test data for a part under test with an end item coordinate system, the method comprising:

acquiring scan data during a plurality of scans of at least a portion of the part of an end item along a predetermined path plan using an ultrasonic scanning device of a robot, wherein the ultrasonic scanning device is controlled by a robot computing system;

recording robot location information associated with the scan data acquired during the plurality of scans, wherein the robot location information is expressed in x, y, z coordinates and based at least in part on a robot coordinate system associated with the robot; and translating the robot location information for the robot coordinate system to end item location information within the end item coordinate system based on common reference points in the predetermined path plan, an electronic design model of the end item within the end item coordinate system, and the part.

2. The method of claim 1, wherein the electronic design model comprises a three-dimensional computer-aided design model.

3. The method of claim 1, wherein the scan data comprises waveform data from each scan of the plurality of scans.

4. The method of claim 1, wherein each scan of the plurality of scans comprises a measurement of an echo off a back wall of an emitted sound wave from the ultrasonic scanning device.

5. The method of claim 1, wherein the predetermined path plan comprises a contiguous path for traversal of the part by the ultrasonic scanning device.

6. The method of claim 1, wherein the x, y, z coordinates for the robot location information are based on an x-axis extending along a horizontal plane from an origin associated with a central point of the ultrasonic scanning device, a y-axis perpendicular to the origin of the x-axis in the horizontal plane, and a z-axis perpendicular to the origin of the x-axis in a vertical plane.

7. The method of claim 1, wherein the end item location information within the end item coordinate system is expressed as x, y, z coordinates with an x-axis extending along a horizontal plane from an origin at a central front point of the end item to a central aft point, a y-axis perpendicular to the origin of the x-axis in the horizontal plane, and a z-axis perpendicular to the origin of the x-axis in a vertical plane.

8. The method of claim 1, wherein each common reference point comprises at least one of a determinate assembly hole within the part, a pilot hole within the part, a stringer within the part, and a key visible feature associated with the part.

9. The method of claim 1, further comprising:

obtaining at least a portion of the electronic design model of the end item associated with the part;

aligning the electronic design model of the part to the robot coordinate system;

generating the path plan for the plurality of scans within the robot coordinate system based on the electronic design model, a predetermined test pattern grid for the part, and a predetermined distance between the ultrasonic scanning device and a surface of the part; and aligning the path plan to the robot coordinate system.

10. The method of claim 9, further comprising:

identifying the common reference points for the part in the electronic design model;

aligning the common reference points to the robot coordinate system to obtain corresponding robot reference coordinates in the robot coordinate system;

positioning the part in relation to the robot prior to the acquiring of the scan data;

moving the ultrasonic scanning device to each of the robot reference coordinates;

for each robot reference coordinate, scanning the part in a vicinity of the corresponding robot reference coordinate to detect as-built reference coordinates relating to the robot reference coordinates and to acquire location information in the robot coordinate system for the as-built reference coordinates; and adjusting alignment of the path plan within the robot coordinate system to obtain the predetermined path plan based on offsets between the as-built reference coordinates and the robot reference coordinates.

11. The method of claim 1, further comprising:

obtaining at least a portion of the electronic design model of the end item associated with the part;

identifying the common reference points for the part in the electronic design model;

aligning the common reference points to the robot coordinate system to obtain corresponding robot reference coordinates in the robot coordinate system;

positioning the part in relation to the robot prior to the acquiring of the scan data;

moving the ultrasonic scanning device to each of the robot reference coordinates;

for each robot reference coordinate, scanning the part in a vicinity of the corresponding robot reference coordinate to detect as-built reference coordinates relating to the robot reference coordinates and to acquire location information in the robot coordinate system for the as-built reference coordinates; and comparing the as-built reference coordinates to the robot reference coordinates to determine if there is an offset requiring adjustment of the predetermined path plan.

12. The method of claim 1, further comprising:

obtaining at least a portion of the electronic design model of the end item associated with the part;

identifying the common reference points for the part in the electronic design model;

aligning the common reference points to the robot coordinate system to obtain corresponding robot reference coordinates in the robot coordinate system;

positioning the part in relation to the robot prior to the acquiring of the scan data;

moving the ultrasonic scanning device to each of the robot reference coordinates;

for each robot reference coordinate, scanning the part in a vicinity of the corresponding robot reference coordinate to detect as-built reference coordinates relating to the robot reference coordinates and to acquire location information in the robot coordinate system for the as-built reference coordinates; and adjusting the robot reference coordinates based on the as-built reference coordinates to obtain at least three adjusted reference coordinates in the robot coordinate system.

13. The method of claim 1, wherein the translating the robot location information comprises:

obtaining the electronic design model of the end item;

identifying the common reference points for the part in the electronic design model;

aligning the common reference points to the robot coordinate system to obtain corresponding robot reference coordinates in the robot coordinate system;

for each robot location information associated with the scan data, determining relationships between the corresponding robot location information in the robot coordinate system and the robot reference coordinates;

obtaining end item reference coordinates in the end item coordinate system for the common reference points from the electronic design model; and for each robot location information associated with the scan data, translating the corresponding robot location information to the end item location information in the end item coordinate system based on the end item reference coordinates and an inverse of the relationships between the corresponding robot location information and the robot reference coordinates.

14. The method of claim 13, wherein the robot reference coordinates are expressed as x, y, z coordinates with an x-axis extending along a horizontal plane from an origin associated with a central point of the ultrasonic scanning device, a y-axis perpendicular to the origin of the x-axis in the horizontal plane, and a z-axis perpendicular to the origin of the x-axis in a vertical plane.

15. The method of claim 13, wherein the relationships between the corresponding robot location information and the robot reference coordinates and the inverse thereof for the end item reference coordinates and the end item location information comprise the end item reference coordinates relative to the end item location information multiplied by the robot location information relative to the robot reference coordinates.

16. The method of claim 13, wherein the end item reference coordinates are expressed as x, y, z coordinates with an x-axis extending along a horizontal plane from an origin at a central front point of the end item to a central aft point, a y-axis perpendicular to the origin of the x-axis in the horizontal plane, and a z-axis perpendicular to the origin of the x-axis in a vertical plane.

17. The method of claim 1, further comprising:

linking the scan data from the plurality of scans with the corresponding end item location information within the end item coordinate system based on the translating such that each scan data is associated with an end item location coordinate.

18. The method of claim 17, further comprising:

receiving a scan data query for at least one of an individual end item location coordinate, a plurality of end item location coordinates, and a range of end item location coordinates;

processing the scan data in response to the scan data query to identify query results; and providing the query results to at least one of a display device, a messaging system, a storage device, and a rendering device.

19. The method of claim 18, wherein the query results form a visual overlay for the part within the electronic design model representative of at least defective locations based on the scan data.

20. The method of claim 19, wherein the electronic design model is rendered in three-dimensions and the visual overlay comprises a solid three-dimensional overlay rendered in multiple colors representing predetermined ranges of the scan data.

21. The method of claim 20, wherein the solid three-dimensional overlay permits selection of a scan data point and display of ultrasonic amplitude data for the scan data point in response to the selection, wherein the ultrasonic amplitude data is indicative of attenuation levels detected at the scan data point.

22. The method of claim 20, wherein the solid three-dimensional overlay permits selection of a scan data point and display of ultrasonic thickness data for the scan data point in response to the selection, wherein the ultrasonic thickness data is indicative of at least one of internal reflections and internal anomalies detected at the scan data point.

23. The method of claim 18, wherein the query results form a visual overlay for the part within the electronic design model representative of at least acceptable locations based on the scan data, wherein the electronic design model is rendered in three-dimensions and the visual overlay comprises a solid three-dimensional overlay rendered in multiple colors representing predetermined ranges of the scan data, and wherein the solid three-dimensional overlay permits selection of a scan data point and display of ultrasonic thickness data for the scan data point in response to the selection, wherein the ultrasonic thickness data is indicative of at least one of internal reflections and internal anomalies detected at the scan data point.

24. A non-destructive inspection (NDI) system for associating test data for a part under test with an end item coordinate system, the NDI system comprising:

a robot, comprising:

a base;

a mechanical arm with a proximal end secured to the base and a distal end;

a flange movably secured to the distal end of the mechanical arm; and an ultrasonic scanning device secured to the flange; and a robot computing system in operative communication with the robot and configured to control movement of the mechanical arm and operation of the ultrasonic scanning device, the robot computing system comprising:

at least one processor and associated memory; and at least one storage device storing at least one application program and robot data, wherein the robot computing system and the robot, in conjunction with the at least one processor running first application programs and accessing first robot data is configured to acquire scan data during a plurality of scans of at least a portion of the part of an end item along a predetermined path plan using the ultrasonic scanning device, wherein the robot computing system and the robot, in conjunction with the at least one processor running second application programs and accessing second robot data is configured to record robot location information associated with the scan data acquired during the plurality of scans, wherein the robot location information is expressed in x, y, z coordinates and based at least in part on a robot coordinate system associated with the robot, and wherein the robot computing system, in conjunction with the at least one processor running third application programs and accessing third robot data is configured to translate the robot location information for the robot coordinate system to end item location information within the end item coordinate system based on common reference points in the predetermined path plan, an electronic design model of the end item within the end item coordinate system, and the part.

* * * * *